(12) United States Patent
Suszek

(10) Patent No.: US 10,909,664 B2
(45) Date of Patent: Feb. 2, 2021

(54) GENERATING AND DISPLAYING BLUR IN IMAGES

(71) Applicant: Google LLC, Mountain View, CA (US)

(72) Inventor: Austin Suszek, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/687,422

(22) Filed: Nov. 18, 2019

(65) Prior Publication Data

US 2020/0143520 A1    May 7, 2020

Related U.S. Application Data

(63) Continuation of application No. 15/976,818, filed on May 10, 2018, now Pat. No. 10,482,583.

(51) Int. Cl.
| | |
|---|---|
| *G06T 3/40* | (2006.01) |
| *G06T 7/50* | (2017.01) |
| *G06T 5/50* | (2006.01) |
| *G06T 5/00* | (2006.01) |
| *G06T 7/194* | (2017.01) |

(52) U.S. Cl.
CPC .............. *G06T 5/002* (2013.01); *G06T 3/40* (2013.01); *G06T 5/50* (2013.01); *G06T 7/194* (2017.01); *G06T 7/50* (2017.01); *G06T 2207/20092* (2013.01); *G06T 2207/20212* (2013.01); *G06T 2210/62* (2013.01)

(58) Field of Classification Search
CPC combination set(s) only.
See application file for complete search history.

(56) References Cited

U.S. PATENT DOCUMENTS

| | | | |
|---|---|---|---|
| 6,975,329 B2 | 12/2005 | Bastos | |
| 8,948,512 B2 * | 2/2015 | Zuczek | G06T 7/143 382/180 |
| 9,230,306 B2 * | 1/2016 | Sun | H04N 13/246 |
| 9,466,113 B2 | 10/2016 | Pham | |

(Continued)

OTHER PUBLICATIONS

Engel, "Shader X2: Shader Programming Tips & Tricks with DirectX 9", Wordware Publishing, Inc., pp. i-vi, 529-556, Color Plate 26, 2004, 36 pages.

(Continued)

*Primary Examiner* — Wesner Sajous
(74) *Attorney, Agent, or Firm* — IP Spring

(57) ABSTRACT

Implementations relate to generating and displaying blur in images. In some implementations, a method includes generating a plurality of mipmap images based on an input image, including applying a blur to a respective plurality of pixels derived from the input image for each mipmap image. In some examples, the blur is at least partially based on depth data for the image. Parameter data is obtained that indicates an output focal plane depth for an output focal plane of an output image and an output focal range in front of the output focal plane. Output pixel values of the output image are generated, including determining blurred pixel values based on one or more of the mipmap images selected based on the output focal plane depth and the output focal range. The blurred pixel values are based on particular pixels associated with a depth outside the output focal range.

20 Claims, 13 Drawing Sheets

(56) References Cited

U.S. PATENT DOCUMENTS

| | | | | |
|---|---|---|---|---|
| 2004/0109004 A1* | 6/2004 | Bastos | ............... | G06T 15/04 345/587 |
| 2007/0182753 A1* | 8/2007 | Isidoro | ............... | G06T 15/04 345/587 |
| 2012/0219236 A1* | 8/2012 | Ali | ............... | G06T 5/002 382/276 |
| 2019/0164354 A1* | 5/2019 | Sasaki | ............... | G02B 27/0101 |

OTHER PUBLICATIONS

WIPO, International Search Report for International Patent Application No. PCT/US2019/023453, dated May 20, 2019, 5 pages.

WIPO, Written Opinion for International Patent Application No. PCT/US2019/023453, dated May 20, 2019, 8 pages.

Hammon, et al., "Chapter 28: Practical Post-Process Depth of Field", Nvidia, Developer Zone; Retrieved from the Internet: https://developer.nvidia.com/gpugems/GPUGems3/gpugems3_ch28.html, Dec. 31, 2007, 22 pages.

Han, et al., "Virtual out of focus with single image to enhance 3D perception", 3DTV Conference: the True Vision—Capture, Transmission and Display of 3D Video, May 16, 2011, pp. 1-4.

Lee, et al., "Real time lens blur effects and focus control", ACM Transactions on Graphics (Proc. of SIGGRAPH), vol. 29, Jul. 2010, pp. 65:1-65:7.

Lee, et al., "Real-Time Depth-of-Field Rendering Using Anisotropically Filtered Mipmap Interpolation", IEEE Transactions on Visualization and Computer Graphics, vol. 15, No. 3, May 1, 2009, pp. 453-464.

Lee, et al., "Real-Time Depth-of-Field Rendering Using Anisotropically Filtered Mipmap Interpolation", IEEE Transactions on Visualization and Computer Graphics, Oct. 2008, pp. 1-12.

McGraw, "Fast Bokeh effects using low-rank linear filters", The Visual Computer, vol. 31, Issue 5, pp. 601-611, May 2015, submitted as pp. 1-20.

McIntosh, et al., "Efficiently Simulating the Bokeh of Polygonal Apertures in a Post-Process Depth of Field Shader", Computer Graphics Forum, The Eurographics Association and Blackwell Publishing Ltd., 2012, pp. 1-12.

Mulder, et al., "Fast perception-based depth of field rendering", VRST 2000, Proceedings of the ACM Symposium on Virtual Reality Software and Technology, Oct. 22, 2000, pp. 129-133.

Scheuermann, "Advanced Depth of Field", ATI Research, Inc., 2004, pp. 1-21.

USPTO, Notice of Allowance for U.S. Appl. No. 15/976,818, dated Jul. 11, 2019, 11 pages.

Yang, et al. "Virtual DSLR: High Quality Dynamic Depth-of-Field Synthesis on Mobile Platforms", Electronic Imaging, Digital Photography and Mobile Imaging XII, Society for Imaging Science and Technology, 2016, pp. 1-9.

Yu, et al., "Real-time Depth of Field Rendering via Dynamic Light Field Generation and Filtering", Pacific Graphics, vol. 29, No. 7, 2010, pp. 1-9.

* cited by examiner

GENERATING AND DISPLAYING BLUR IN IMAGES

CROSS-REFERENCE TO RELATED APPLICATIONS

The present application is a continuation of U.S. patent application Ser. No. 15/976,818, filed May 10, 2018 and titled GENERATING AND DISPLAYING BLUR IN IMAGES, the entire content of which is hereby incorporated by reference.

BACKGROUND

The popularity and convenience of digital camera devices have caused visual content such as digital photographs and videos to become ubiquitous. For example, large numbers of images of various types can be captured, stored, and displayed by user devices. Some devices and software can process images to add effects to those images, including effects that simulate use of a physical camera. For example, blur effects and other visual effects can be digitally added to images to simulate the use of lenses and other analog or mechanical components of cameras.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to generating and displaying blur in images. In some implementations, a computer-implemented method to provide blurring in an image includes obtaining an input image; generating a plurality of mipmap images based on the input image, where generating each mipmap image of the plurality of mipmap images includes applying a blur to a respective plurality of pixels derived from the input image; obtaining parameter data that indicates an output focal plane depth for an output focal plane of an output image and that indicates an output focal range in front of the output focal plane; and generating output pixel values of the output image that include output blur. Generating the output pixel values includes determining blurred pixel values based on one or more selected mipmap images selected from the plurality of mipmap images based on the output focal plane depth and the output focal range, where the blurred pixel values are based on particular pixels associated with a depth outside the output focal range.

Various implementations and examples of the method are described. For example, in some implementations, generating the plurality of mipmap images includes generating a plurality of background mipmap images based on the input image, which includes applying a respective background blur to each of a plurality of background pixels derived from the input image, where each background pixel has a respective depth behind a respective focal plane associated with the background pixel; and generating a plurality of foreground mipmap images based on the input image, which includes applying a respective foreground blur to each of a plurality of foreground pixels derived from the input image, where each foreground pixel has a respective depth in front of a respective focal plane associated with the foreground pixel, and the one or more selected mipmap images include one or more of the background mipmap images and one or more of the foreground mipmap images.

In some implementations, generating the plurality of mipmap images includes downscaling the input image to a plurality of downscaled images, and wherein applying the blur to the respective plurality of pixels includes applying the blur to a respective plurality of downscaled pixels of the downscaled images. For example, the downscaling can include downscaling the input image to a plurality of background downscaled images and applying the respective background blur to each of the background pixels of the background downscaled images, and downscaling the input image to a plurality of foreground downscaled images and applying the respective foreground blur to each of the foreground pixels of the foreground downscaled images. In some examples, at least two of the background downscaled images are downscaled by different scale levels, and at least two of the foreground downscaled images are downscaled by different scale levels.

In some implementations, applying the respective background blur to each of the plurality of background pixels includes applying the respective background blur to each background pixel based on surrounding pixels derived from the input image that surround the background pixel, based on a depth of the background pixel into a scene depicted by the input image, and based on a focal plane associated with the background pixel, where the focal plane is determined based on the depth of the background pixel and a background mipmap blur level assigned to the background mipmap image. In some implementations, applying the respective foreground blur to each of the plurality of foreground pixels of the respective foreground mipmap image includes applying the respective foreground blur to each foreground pixel based on surrounding pixels of the input image that surround the foreground pixel, and based on a foreground focal plane depth of a foreground focal plane associated with the foreground mipmap image.

In some implementations, generating output pixel values includes determining opaque pixel values based on at least one background mipmap image selected based on the output focal plane depth, determining overlay pixel values based on at least one foreground mipmap image selected based on the output focal range, and combining the opaque pixel values with corresponding values of the overlay pixel values to determine the output pixel values of the output image.

In some implementations, determining the opaque pixel values based on at least one background mipmap image includes, for each background pixel derived from the input image, selecting one or more background mipmap images from the plurality of background mipmap images based on the depth of the background pixel and based on the output focal plane depth; and using the one or more background mipmap images to determine a particular opaque pixel value corresponding to the background pixel. In some implementations, determining the overlay pixel values based on at least one foreground mipmap image includes, for each foreground pixel derived from the input image, selecting one or more foreground mipmap images of the plurality of foreground mipmap images based on the output focal plane depth and based on the output focal range; and using the one or more foreground mipmap images to determine a particular overlay pixel value corresponding to the foreground pixel. In some implementations, the combining includes using transparency values associated with the overlay pixel values, the transparency values indicating a respective transparency of the overlay pixel values.

In some implementations, a computer-implemented method to provide blurring in an image includes obtaining an input image; generating a plurality of mipmap images based on the input image, where generating the plurality of mipmap images includes, for each mipmap image, applying a blur to each particular pixel of a plurality of pixels derived from the input image for the mipmap image, where the blur is applied to each particular pixel based on a depth of the particular pixel into a scene depicted by the input image and based on a focal plane associated with the particular pixel; obtaining data indicating an output focal plane depth for an output focal plane of an output image; determining blurred output pixel values of the output image using at least one selected mipmap image of the plurality of mipmap images, including, for each designated pixel of a set of pixels of the input image, selecting the at least one mipmap image based on the depth of the designated pixel and based on the output focal plane depth; and causing the output image to be displayed on a display device.

Various implementations and examples of the method are described. For example, in some implementations, generating the plurality of mipmap images includes, for each mipmap image, downscaling the input image to a downscaled image, where applying the blur to each particular pixel of the plurality of pixels of the mipmap image includes applying the blur to each particular pixel of a plurality of pixels of the downscaled image. In some implementations, generating the plurality of mipmap images includes, for each mipmap image, assigning a mipmap blur level to the mipmap image, where the focal plane associated with the particular pixel is determined based on the depth of the particular pixel and based on the mipmap blur level assigned to the mipmap image, such that respective focal planes associated with the pixels of the mipmap image vary among different pixels of the mipmap image.

In some implementations, using the at least one selected mipmap image includes determining a difference between the depth of the designated pixel and the output focal plane depth, and selecting one or more particular mipmap images of the plurality of mipmap images which have a respective mipmap blur level that is closest among the plurality of mipmap images to a lookup value determined based on the depth of the designated pixel and the output focal plane depth. In some examples, the two mipmap images closest to the lookup value are blended together (e.g., interpolated). In some implementations, the method can further include obtaining a blur strength parameter that indicates a level of blur for the output image, where the blur strength parameter is based on user input, where determining the blurred output pixel values includes, for each designated pixel of the input image, interpolating between a corresponding mipmap pixel value and the pixel value of the input image using the blur strength parameter.

In some implementations, the plurality of mipmap images are background mipmap images, applying the blur includes applying a background blur based on pixels associated with a depth behind the focal plane associated with the particular pixel, and the method further includes generating a plurality of foreground mipmap images based on the input image, where generating each of the foreground mipmap images includes applying respective foreground blur to each particular foreground pixel of a second plurality of pixels of the foreground mipmap image; and determining the blurred output pixel values includes determining, based on the output focal plane depth, whether each pixel of the input image is one of a background pixel associated with a depth value behind the focal plane of the output image, or a foreground pixel associated with a depth value in front of the focal plane of the output image, using at least one of the background mipmap images in response to the pixel of the input image being a background pixel, and using at least one of the foreground mipmap images in response to the pixel of the input image being a foreground pixel.

In some implementations, applying the blur is applying a background blur based on the particular pixel associated with a depth behind the respective focal plane associated with the particular pixels, where the method further includes obtaining a focal range parameter for the input image, the focal range parameter indicating an output focal range in front of the focal plane of the output image, where pixels associated with a depth in the output focal range do not contribute to blur of surrounding pixels that surround the pixels associated with the depth in the output focal range; and adding a respective foreground blur to one or more output pixel values of the output image, where the respective foreground blur is based at least in part on the focal range parameter. For example, in some implementations, the method further includes generating a plurality of foreground mipmap images based on the input image, and adding the respective foreground blur to one or more output pixel values of the output image includes determining overlay pixel values using at least one foreground mipmap image, where adding the respective foreground blur includes combining the overlay pixel values with corresponding output pixel values of the output image.

In some implementations, a system includes a memory and at least one processor configured to access the memory and configured to perform operations including obtaining an input image; generating a plurality of background mipmap images based on the input image, where generating each of the background mipmap images includes applying a background blur to a plurality of background pixels derived from the input image for a respective background mipmap image, and each background pixel is associated with a respective depth behind a respective focal plane associated with the background pixel; generating a plurality of foreground mipmap images based on the input image, where generating each of the foreground mipmap images includes applying a foreground blur to a plurality of foreground pixels derived from the input image for a respective foreground mipmap image, and each foreground pixel is associated with a respective depth in front of a respective focal plane associated with the foreground pixel; obtaining parameter data indicating an output focal plane depth for an output focal plane of an output image and indicating an output focal range in front of the output focal plane; and generating output pixel values of the output image that include an output blur. The output blur is based on particular pixels associated with a depth outside the output focal range. Generating the output pixel values includes: determining opaque pixel values based on at least one background mipmap image selected based on the output focal plane depth; determining overlay pixel values based on at least one foreground mipmap image selected based on the output focal range; and combining the opaque pixel values with corresponding values of the overlay pixel values to determine the output pixel values of the output image.

In some implementations, a non-transitory computer readable medium has stored thereon software instructions that, when executed by a processor, cause the processor to perform operations. The operations can include operations of the methods or system as described above.

DETAILED DESCRIPTION

Figure 1:
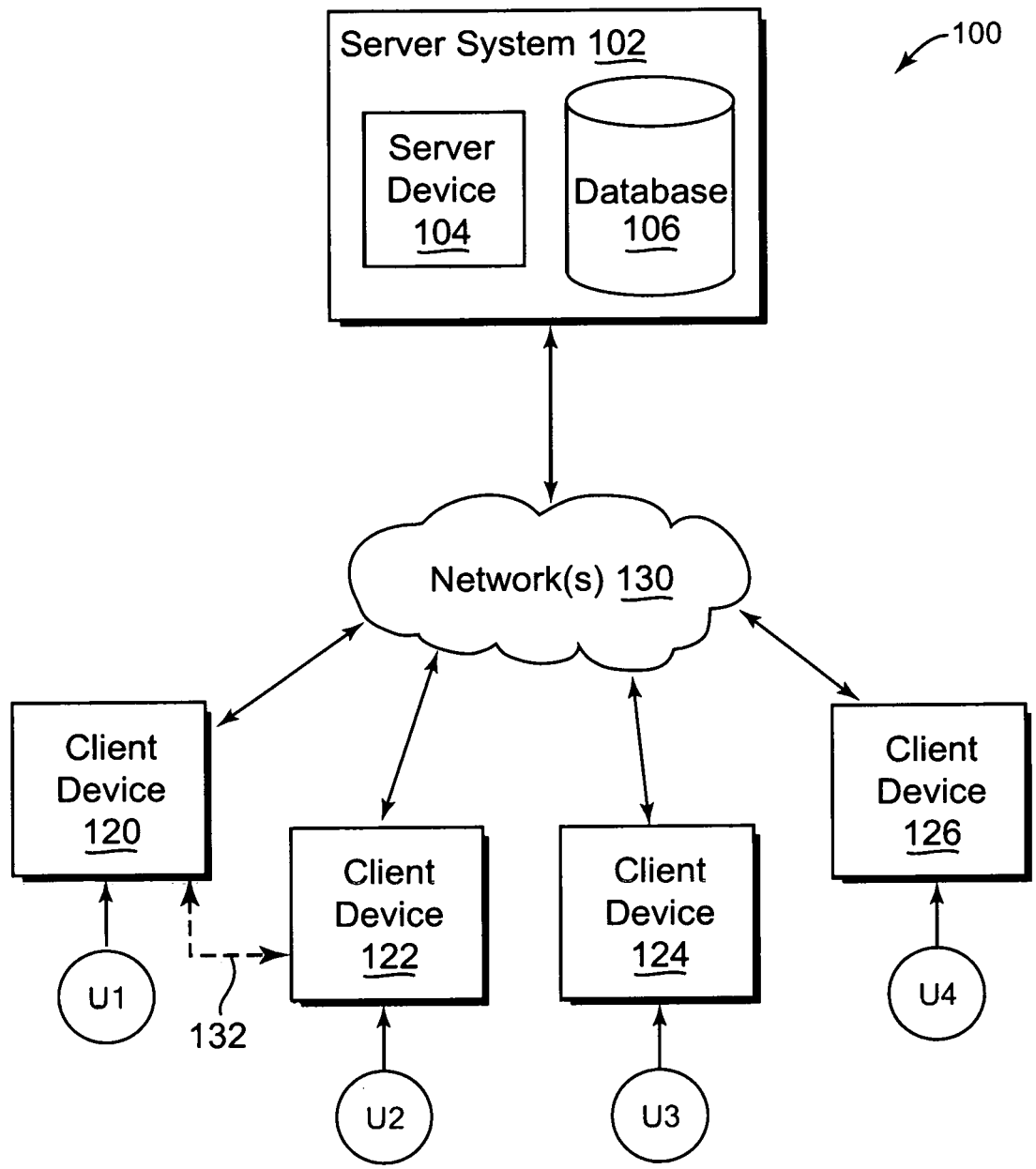
FIG. 1 is a block diagram of example systems and a network environment which may be used for one or more implementations described herein.

One or more implementations described herein relate to generating and displaying blur effects in images, e.g., where the amount of blur depends on the distance of objects (e.g., described by pixels) into a depicted scene from a front image plane or camera. For example, implementations can provide a bokeh type of blur in images, e.g., images for which depth data has been obtained for the pixels of the image. In various implementations, a system generates multiple mipmap images that include blurred pixels based on the pixels of an input image. One or more of the mipmap images are selected, e.g., based on an output focal plane depth, an output focal range, and depth values of a plurality of pixels, and are used to generate blurred pixels for an output image that, for example, includes blur in the scene depicted in the input image. The blurred pixels can provide a blur effect such as a bokeh effect in which foreground and/or background pixels are blurred based on a depth of a focal plane. In various implementations, user input can adjust blur parameters such as the focal plane depth and/or a focal range, and the blur effect resulting from such adjusted parameters is generated and displayed quickly after the adjustment.

In some implementations, various mipmap images are generated by downscaling the input image. Different blur amounts are applied to different pixels of the downscaled image to generate the mipmap image. In some examples, a respective blur can be applied to each pixel using a blur equation that is dependent on a depth of the pixel into a scene depicted by the downscaled image and based on a focal plane associated with that pixel. The focal plane can be based on the depth of the particular pixel and based on an assigned mipmap blur level for the mipmap image. The respective focal planes associated with the pixels of a mipmap image vary among different pixels of the mipmap image, which allows all the pixels of the mipmap image to represent the particular blur level assigned to that mipmap image. In some implementations, background mipmap images and foreground mipmap images are generated based on the input image, where each background pixel has a respective depth behind a focal plane associated with the background pixel, and each foreground pixel has a respective depth in front of a focal plane associated with the foreground pixel.

In some implementations, each of the generated mipmap images is associated with or assigned a parameter representing a blur level or a depth (e.g., a foreground depth for foreground mipmap images, in some implementations). In some implementations, for example, a focal plane associated with a particular pixel can be based on the depth of the particular pixel and based on the mipmap blur level (or other parameter) assigned to the mipmap image such that respective focal planes associated with the pixels of the mipmap image vary among different pixels of the mipmap image.

When rendering a blurred output image, an output focal plane depth is obtained for the output focal plane of the output image, e.g., based on user input. Output pixel values of the output image are determined by, for each such pixel, selecting at least one of the generated mipmap images based on the depth of a pixel and based on the output focal plane depth, and obtaining a blurred pixel value from the selected mipmap image(s).

In some implementations, output pixel values of the output image are generated based on opaque pixel values from at least one background mipmap image that is selected based on the output focal plane depth, and overlay pixel values from at least one foreground mipmap image that is selected based on an output focal range, and combining the opaque pixel values with corresponding overlay pixel values to determine the output pixel values of the output image.

In some implementations, an output focal range for the output image can be specified by user input, which is a depth range in front of the focal plane of the output image. Pixels in front of the focal range cause a foreground blur. Pixels associated with a depth within the output focal range do not cause or contribute to blurring of pixels of the output image, e.g., blurring of pixels of an output image is based on pixels associated with a depth outside the output focal range. Mipmaps can be selected and blurred pixels used from the mipmaps based on the specified output focal range and the specified output focal plane depth.

One or more features described herein enable fast and efficient generation of realistic blur in an image, e.g., a bokeh effect. Disclosed features include pre-computation of mipmap images that have blurred pixel values based on an input image. In some examples, one or more of the mipmap images are selected and used to blur an output image, where the blurring of the output image at a certain point (e.g., pixel) is related to the depth at that point, thus simulating the effect of some physical cameras. The use of such mipmap images allows a lookup process to be used in response to input or change in blur parameters, providing a fast rendering of a blurred image. Such a process is much faster than computing blurred pixels in response to the input or change of blur parameters. For example, a common technique for applying bokeh to an image is to render a blurred disk for every pixel of the image, where the radius of the disk is 0 for pixels on the focal plane and grows for pixels farther away from the focal plane. Such a technique runs into performance issues when trying to render a bokeh effect quickly in response to user input.

Thus, using described features, blur parameters can be provided as user controlled parameters which can be changed on the fly. The change in blur effects resulting from change of some blur parameters can be animated in an image as well, e.g., showing a transition effect from one blur effect to another. Such features should be used with a very fast performance of rendering blur effects in an image, as provided by the described features, in order to keep a decent frame rate while the user is editing blur effects by changing blur parameters.

Described features include providing a different focal plane associated with each blurred pixel in a particular mipmap image. This allows all of the pixels in a single mipmap image to be blurred, where a particular blur level is associated with the mipmap image. Since all of the pixels of the mipmap are blurred, the mipmap image can be downscaled, thus saving storage space on storage devices. In contrast, if each mipmap represented blurring at a single focal plane depth, every mipmap could have blurred and unblurred pixels, such that all mipmaps would need to be kept at a relatively high resolution instead of downscaling the mipmap images to lower resolutions, thus resulting in using more storage space.

Described features include generating a blur effect (e.g., bokeh effect) that takes into account a variable focal range in the image. For example, the user can specify the focal range for a blurred output image. Described implementations provide background and foreground mipmap images providing different blur contributions to blurred pixels, and where blurred contributions from the foreground mipmap images take into account a focal range parameter. Such a variable parameter allows greater options and flexibility in generating different bokeh effects in images.

The described features can enable faster and more efficient generation and display of blur effects in images, more efficient storage of pre-computed mipmap images providing blurred pixels, and greater options and flexibility in generating different blur effects, thus reducing consumption of device resources that would otherwise be needed to generate desired blur effects in images. Consequently, a technical effect of one or more described implementations is that generation and display of fast, realistic, and varied blur effects in images is provided with less computational time and fewer computational resources expended to obtain results. For example, a technical effect of described techniques and features is a reduction in the consumption of system processing resources utilized to generate blur effects in images as compared to prior systems that do not provide one or more of the described techniques or features.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

An image, as referred to herein, is a digital image having pixels with one or more pixel values (e.g., color values, brightness values, etc.). An image includes image data that is a digital representation of an image, such as a pixel map or other representation of an image including numeric values (pixel values) stored in a file and usable to render an image in an electronic display. An image can be a still image or single image, or can be an image included in a series of images, e.g., a frame in a video sequence of video frames, or an image in a different type of sequence or animation of images. A video includes a sequence of multiple images. For example, implementations described herein can be used with content data items that are single images or static images (e.g., a photograph, an emoji, or other image), videos, or animated images (e.g., cinemagraphs or other animated image that includes motion, a sticker that includes animation and audio, etc). Text, as referred to herein, can include alphanumeric characters, emojis, symbols, or other characters. An audio segment can include audio data that is provided in a standard audio format which can be processed to provide sound, e.g., from speakers.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service, or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications, send content (images, text, audio data, etc.) to each other's devices, etc. In some implementations, a "user" can include one or more programs or virtual entities, as well as persons that interface with the system or network.

In some implementations, server system 102 and/or one or more client devices 120-126 can provide a display content program. The display content program may allow a system (e.g., client device or server device) to display content data such as one or more images in a particular layout (e.g., based on a grid).

A user interface can enable display of content data such as images, as well as enable communications, privacy settings, notifications, and other functions on a client device 120, 122, 124, and 126 (or alternatively on server system 102). Other applications can also be used with one or more features described herein, such as browsers, email applications, communication applications, etc. Such a user interface can be displayed using the display content program or other software on the client device, software on the server device, and/or a combination of client software and server software executing on server device 104, e.g., application software or client software in communication with server system 102. The user interface can be displayed by a display device of a client device or server device, e.g., a display screen(s), projector, etc. In some implementations, application programs running on a server system can communicate with a client device to receive user input at the client device and to output data such as visual data, audio data, etc. at the client device. For example, the user interface may provide various options to a user to cause the display of content data to view, select particular content data, etc.

In some examples, the network environment 100 can detect content characteristics of content data items and determine blur characteristics based on the content characteristics. For example, image features can include people (without determining identity of the people), animals, objects (e.g., articles, vehicles, etc.), particular monuments, landscape features (e.g., foliage, mountains, lakes, sky, clouds, sunrise or sunset, buildings, bridges, etc.), weather, etc. Various image recognition and detection techniques can be used (e.g., machine learning based on training images, comparison to reference features in reference images, etc.) to detect image content features. Some implementations can detect audio content features in audio segments, and determine blur characteristics based on the audio features. Audio content features can include recognized words from voice, etc. In some example implementations, server system 102 may include classifiers of particular types of content data items (e.g., images), and can determine whether any of particular classes are detected in the content data items (e.g., pixels of an image).

Various implementations of features described herein can use any type of system and/or service. For example, social networking services, image collection and sharing services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
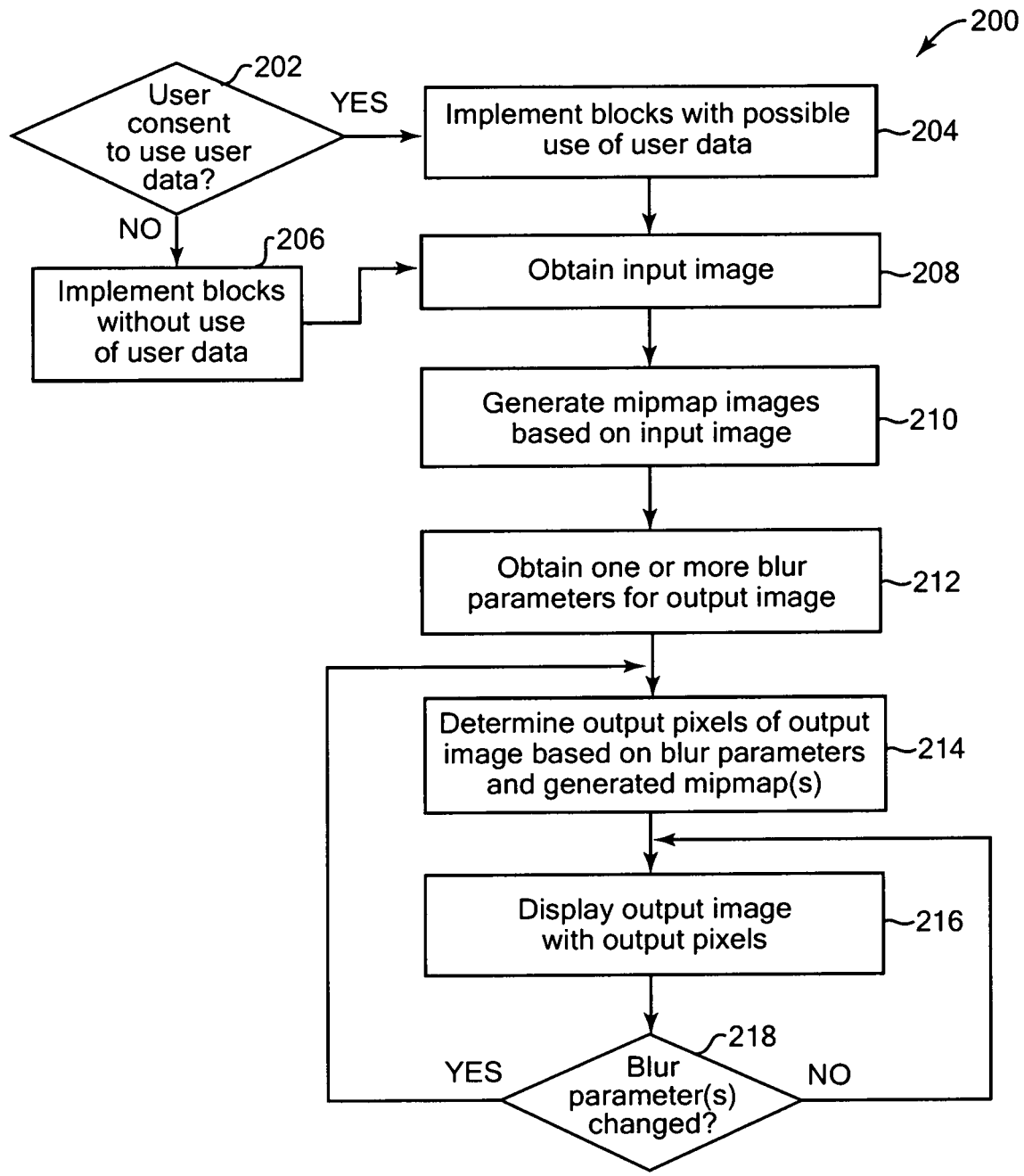
FIG. 2 is a flow diagram illustrating an example method to provide and display blur in images, according to some implementations.

FIG. 2 is a flow diagram illustrating an example method 200 to provide and display blur in images, according to some implementations. In some implementations, method 200 can be implemented, for example, on a server system, e.g., messaging server 101, as shown in FIG. 1. In some implementations, some or all of the method 200 can be implemented on a system such as one or more client devices 120-126 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input.

In some implementations, the method 200, or portions of the method, can be initiated automatically by a user device. For example, the method (or portions thereof) can be periodically initiated, or initiated based on the occurrence of one or more particular events or conditions. For example, such events or conditions can include a particular application being opened based on user input, obtaining one or more images or other content data items that have been newly captured/created by, uploaded to, or otherwise accessible by a user device, a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 200 with access to a collection of accessible content data items, e.g., a user's collection of images or other content data items (if user consent is received). In another example, a camera, cell phone, tablet computer, wearable device, or other client device can capture one or more content data items such as images, videos, etc., and can perform the method 200. In addition, or alternatively, a client device can send one or more content data items (e.g., captured content data items) to a server over a network, and the server can process the content data items using method 200.

In block 202, it is determined whether user consent (e.g., user permission) has been obtained to use user data in the implementation of method 200. For example, user data can include user preferences, user biometric information, images or other content data items in a content collection (e.g., images captured, uploaded, generated, received, accessed, or otherwise associated with a user), messages sent or received by a user, information about a user's social network and/or contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, the remainder of method 200 is not performed, and/or particular blocks using the user data are not performed. In some implementations, if user consent has not been obtained, blocks of method 200 are to be implemented without use of user data and with generic or publicly-accessible and publicly-usable data.

In block 208 of method 200, an input image is obtained for processing. The input image can be a digital image composed of multiple pixels, for example, and can be stored on one or more storage devices of the system or otherwise accessible to the system, e.g., a connected storage device such as a local storage device, storage device connected to or in communication with a network accessible to the system, etc. For example, the input image can be a photo captured by a camera, an image frame extracted from a captured video stream or other video data, or an image derived from a different source.

In some implementations, a user can provide, select, or designate one or more input images to obtain for processing. In some implementations, the input image can be automatically obtained by the method, e.g., as an image from a stored collection of multiple images, e.g., from a user's album, a pool of stored images submitted by users, etc. Automatic obtaining of an input image from a user's collection is performed with the user's consent as indicated in block 204, e.g., via stored user preferences accessed by block 206. The collections can be locally stored and accessible by the system performing method 200, and/or can be remotely stored on a server or client device, e.g., as one or more albums provided in account(s) of user(s) of a network service. In some implementations, the system can determine which image to select based on evaluating one or more characteristics of accessible images, e.g., timestamps and other metadata of images, the color distributions of images, the recognized content or labels describing content in images, user data such as user preferences, etc. (accessed if user consent has been obtained).

For example, in some implementations, a system can automatically (e.g., without human intervention) select a particular input image for processing. For example, such selection may be determined (with user consent) based on user data, including stored user preferences, a user history of previous modifications made by the user to other images, social data indicating user preferences (e.g., previous comments, ratings, etc. made by the user), locations visited by the user's device (e.g. as detected by GPS sensors on the device), activities of the user (e.g., sensed or inferred by locations visited by the user), etc. The method continues to block 210.

In block 210, mipmap images are generated based on the input image. A mipmap image is an image included in a mipmap, which is a group of images representing an original image (e.g., the input image) at different pixel resolutions. In some examples, one or more mipmap images can be lower resolution than the original image, and can be provided in a sequence of reducing resolutions such that different mipmap images are at different scale levels (resolutions) of the mipmap.

The mipmap images can be generated at a number of different resolutions (scale levels), where the resolutions generated may have been determined prior to the performance of block 210. In some examples, the scale levels provided can be the same regardless of the characteristics of the input image, or can be different based on one or more characteristics of the input image. For example, the image characteristics can be a timestamp of the input image, a location of capture of the input image, one or more features depicted in the image using one or more image recognition techniques, machine learning techniques, etc.), etc. In some examples, if particular types of features are detected in the input image (e.g., faces, objects of particular type, monuments, etc.), then particular resolutions can be provided for the mipmap images, or if only other types of features are detected, then a different set of resolutions can be provided for the mipmap images.

In some implementations, background mipmap images and foreground mipmap images are generated. In some implementations, the background mipmap images can be used for processing background pixels of the input image, and the foreground mipmap images can be used for processing foreground pixels of the input image, as described herein. In some implementations, background and foreground mipmap images can be used to process one or more pixels of the input image. Some example methods of generating background and foreground mipmap images are described with respect to FIGS. 4 and 7. Generated mipmap images can be stored in accessible storage, e.g., memory and/or other storage devices. The method continues to block 212.

In block 212, one or more blur parameters are obtained for an output image to be generated. The blur parameters specify one or more characteristics of the blurring to be performed to the pixels of the input image. In some examples, the blur parameters may include a focal plane depth, a focal range, and a blur strength.

Figure 3:
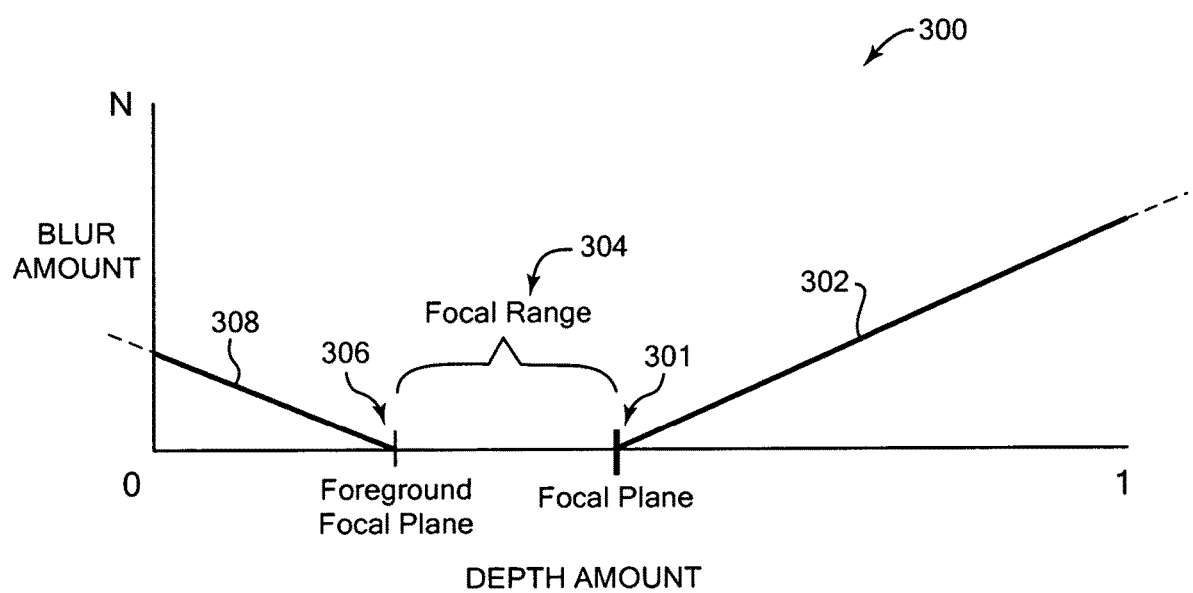
FIG. 3 is a diagrammatic illustration of a graph showing example blur curves and blur parameters, according to some implementations.

Referring to FIG. 3, a graph 300 illustrates some example blur parameters and blur curves that can be used in blurring an image. In graph 300, the horizontal axis represents depths into the image from a front plane of the image (e.g., camera position), and as indicated on the axis by depth values that can be normalized to a range from 0 to 1. For example, the depth is provided along a dimension oriented perpendicular to the plane of the image, e.g., a z-axis extending into the image. The vertical axis represents an amount or magnitude of blur to be applied to the pixels of the image to provide a blur effect, and can have a value of 0 to N, where N can be a maximum blur radius.

A focal plane depth 301 indicates a depth value of the focal plane along the depth axis, e.g., the depth value which is "in focus" for an image. For pixels at this depth, no blur should be applied to those pixels. The amount of blur applied to pixels at other depths can depend at least in part on the depth distance of those pixels to the focal plane. Pixels having depth values behind the focal plane (further away from the front plane of the image or camera that captured the image) are considered background pixels, and pixels having depth values in front of the focal plane are considered foreground pixels.

A background blur curve 302 indicates the amount of blur that is applied based on the depth of a background pixel, e.g., based on the depth deviation of the pixel from the focal plane depth into the image (away from the front plane of the image). In this example, background blur curve 302 is linear, but can be a curve of any shape in various implementations, e.g., as long as the curve represents an invertible function.

In some examples, the blur parameters can include a focal range 304. Focal range 304 is an amount of depth distance in front of the focal plane (towards the front plane of the image or camera). No blurring is applied to foreground pixels having a depth value within the focal range 304. For example, if the focal range is shallow, most of the foreground pixels are to be blurred the same way a digital single reflect lens (SLR) camera would blur them. If the focal range is large, most or all foreground pixels would remain unblurred.

A foreground focal plane 306 is determined based on the focal range 304. The foreground focal plane 306 indicates the other endpoint of the focal range from the focal plane 300.

A foreground blur curve 308 indicates the amount of blur that is applied based on the depth of a foreground pixel, e.g., based on the depth deviation of the pixel from the foreground focal plane depth toward the front plane of the image. In this example, foreground blur curve 308 is linear, but can be a curve of any shape in various implementations, e.g., a curve that represents an invertible function. In some implementations, foreground blur curve 308 is independent of the background blur curve 302.

In some examples, the blur parameters include a blur strength parameter, which can control an overall amount of blur to be applied to the input image to generate the output image. For example, the blur strength parameter can determine the value of N in the graph 300. In some examples, if this parameter is set to 0 ("none"), no blurring is applied to any pixels of the input image, and if this parameter is set to a maximum value or setting, pixels of the input image are blurred by the full amount determined in the blurring process. If this parameter is set to an intermediate value between maximum and none, then blur determined in the blurring process is reduced in accordance with the intermediate value (e.g., a 0.5 value can reduce the determined blur by half its strength).

Referring back to FIG. 2, in some implementations, one or more of the blur parameters can be obtained based on user input from a user. For example, a user interface can be displayed by a user device, which presents interface input fields or controls allowing the user to set or adjust the blur parameters for the blurring of the input image. In some implementations, one or more of the blur parameters can be obtained from accessible storage, e.g., specified prior to block 212 via stored user preferences, as default parameters, from a different application program or storage device, or from another source. The method continues to block 214.

In block 214, output pixels of an output image are determined, where the output pixels include pixels having blur. The output image is an image including blur as resulting from processing the pixels of the input image by the processing of method 200. The blur in output pixels is determined based on one or more of the generated mipmaps. For example, the one or more mipmaps can be selected based on particular characteristics of pixels of the input image, including depth values. Some example methods of determining output pixel values are described below with respect to FIGS. 6 and 9. The method continues to block 216.

In block 216, an output image is displayed, including the output pixels determined in block 214. For example, the output image can be displayed in a graphical user interface provided on a user device. In some implementations, the output image can be displayed while the input image is displayed, e.g., to allow a user to compare the input image and the output image. The method can continue to block 218.

Figure 10:
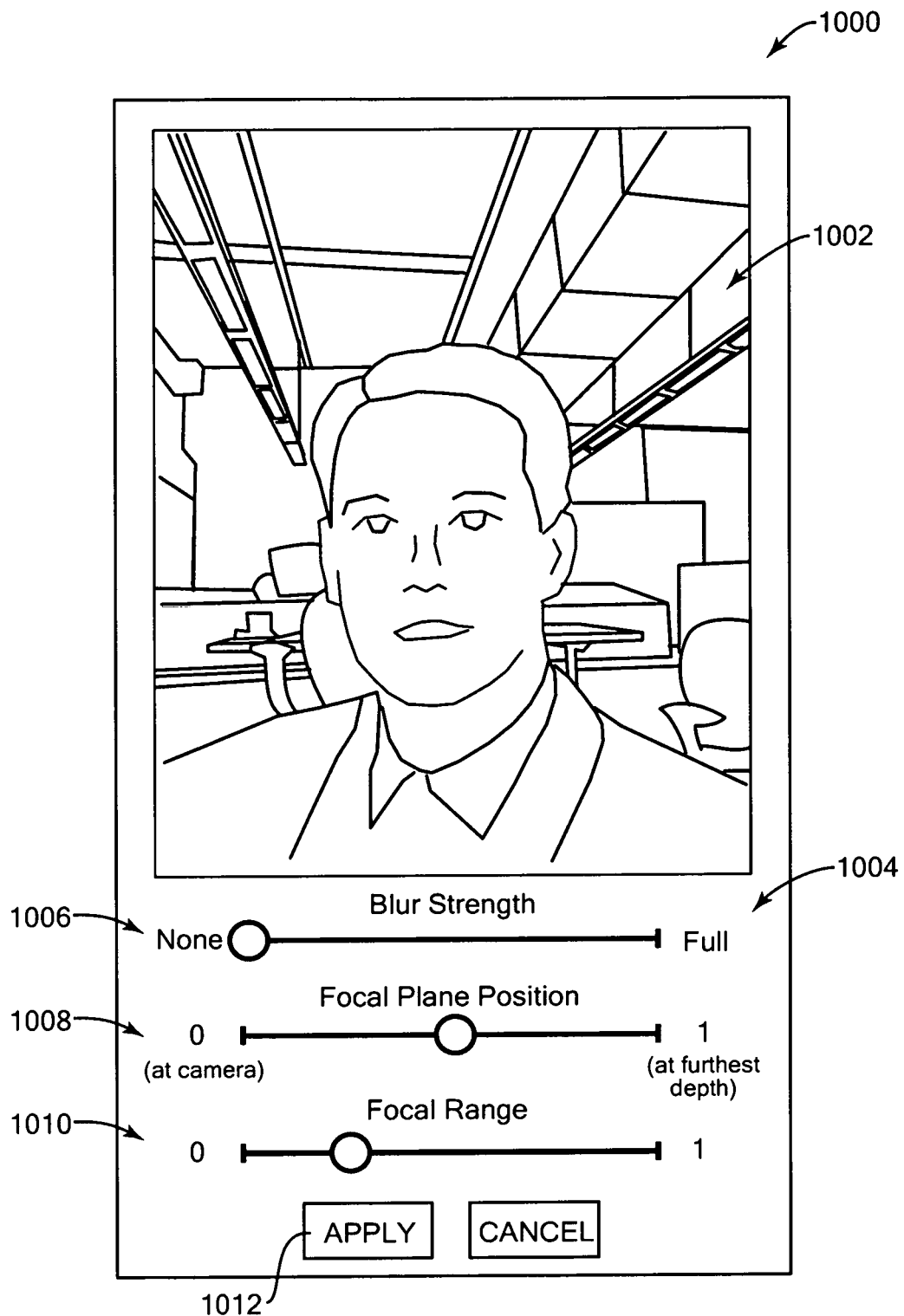
FIGS. 10-12 are graphic representations of example user interfaces that provide adjustable blur parameters and blur effects in a displayed image, according to some implementations.
Figure 11:
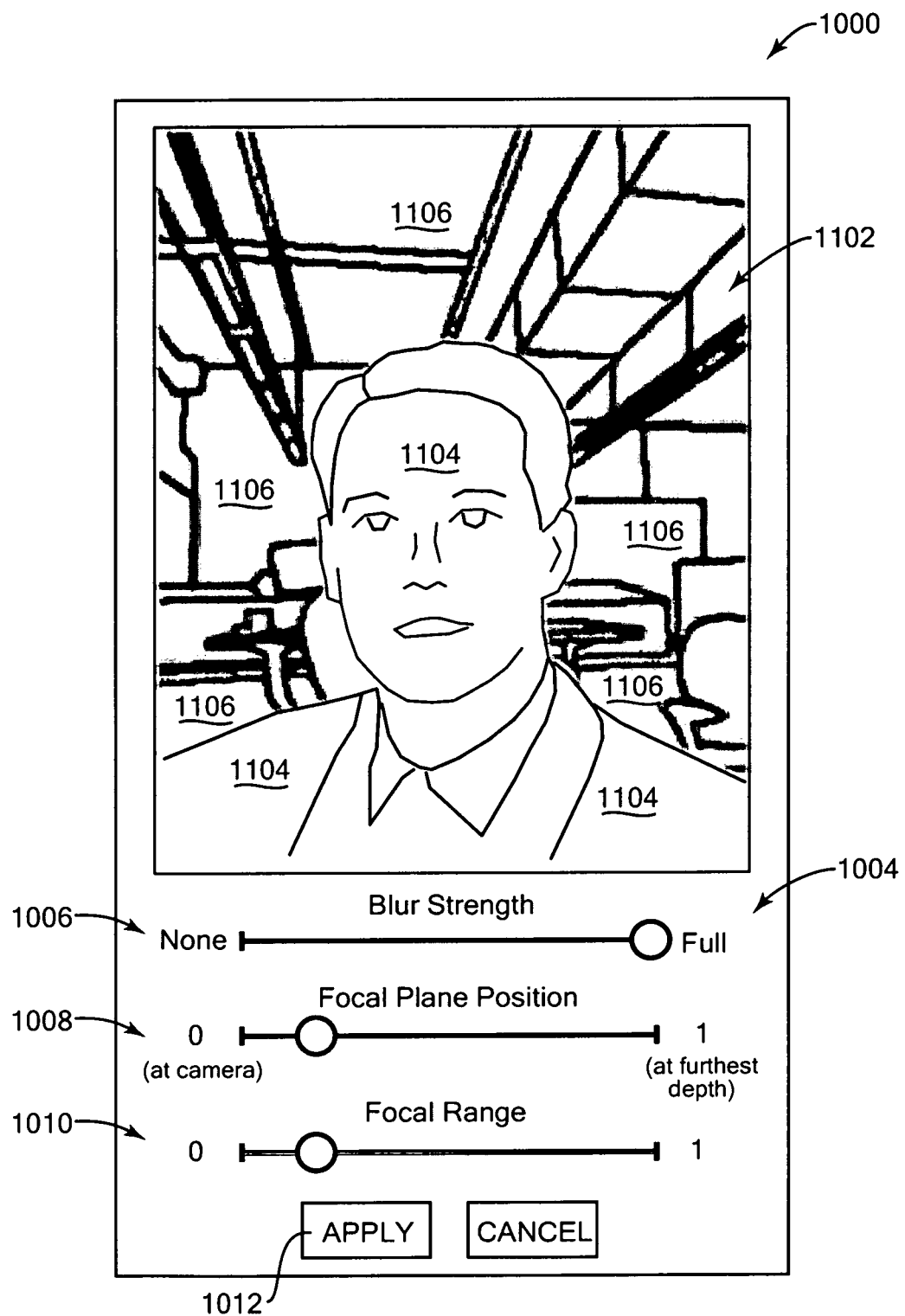
Figure 12:
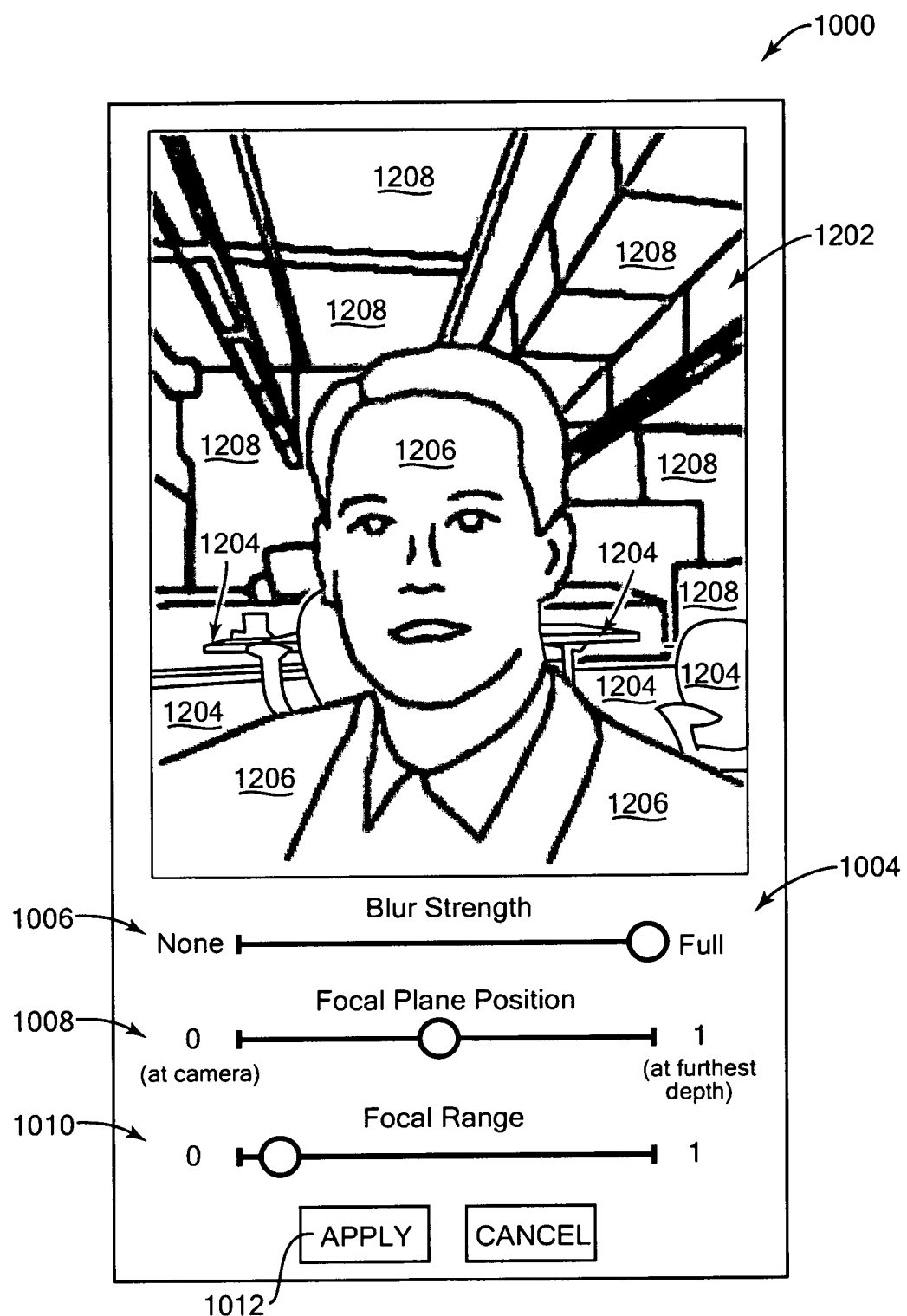

In block 218, it determined whether one or more of the blur parameters are changed. In various implementations, the displayed user interface can include controls that are receptive to user input (e.g., user touch on a touchscreen, receiving user voice commands, user manipulation of an input control device such as joystick, trackpad, etc.) and that allow the user to adjust one or more blur parameters in accordance with the user input. For example, one or more sliders or other controls can be displayed, examples of which are shown in FIGS. 10-12. Blur parameters can also or alternatively be changed without user input, e.g., based on other events, user preferences, time conditions, at different stages of a displayed animation of change in blurring, etc.

If blur parameters have not been changed, the method can return to block 216 to continue to display the output image, and/or other user input or events are determined, etc.

If blur parameters have been changed, then the method continues to block 214, where output pixels are determined based on the new set of blur parameters. For example, the input image previously obtained in block 208 and the mipmap images previously generated in block 210 can be used to determine new output pixel values and generate a new output image, which is displayed in block 216, e.g., in place of the previously generated output image.

Due to the use of mipmap images that have been generated prior to the application and/or change in blur parameters, the determination and display of blurred output images based on the blur parameters can be performed quickly after blur parameters have been specified. This allows ease of editing blur parameters and viewing of the effects of the editing. This is in contrast to the much greater processing time in having to compute blur effects in the pixels of the input image for each change in blur parameters.

Figure 4:
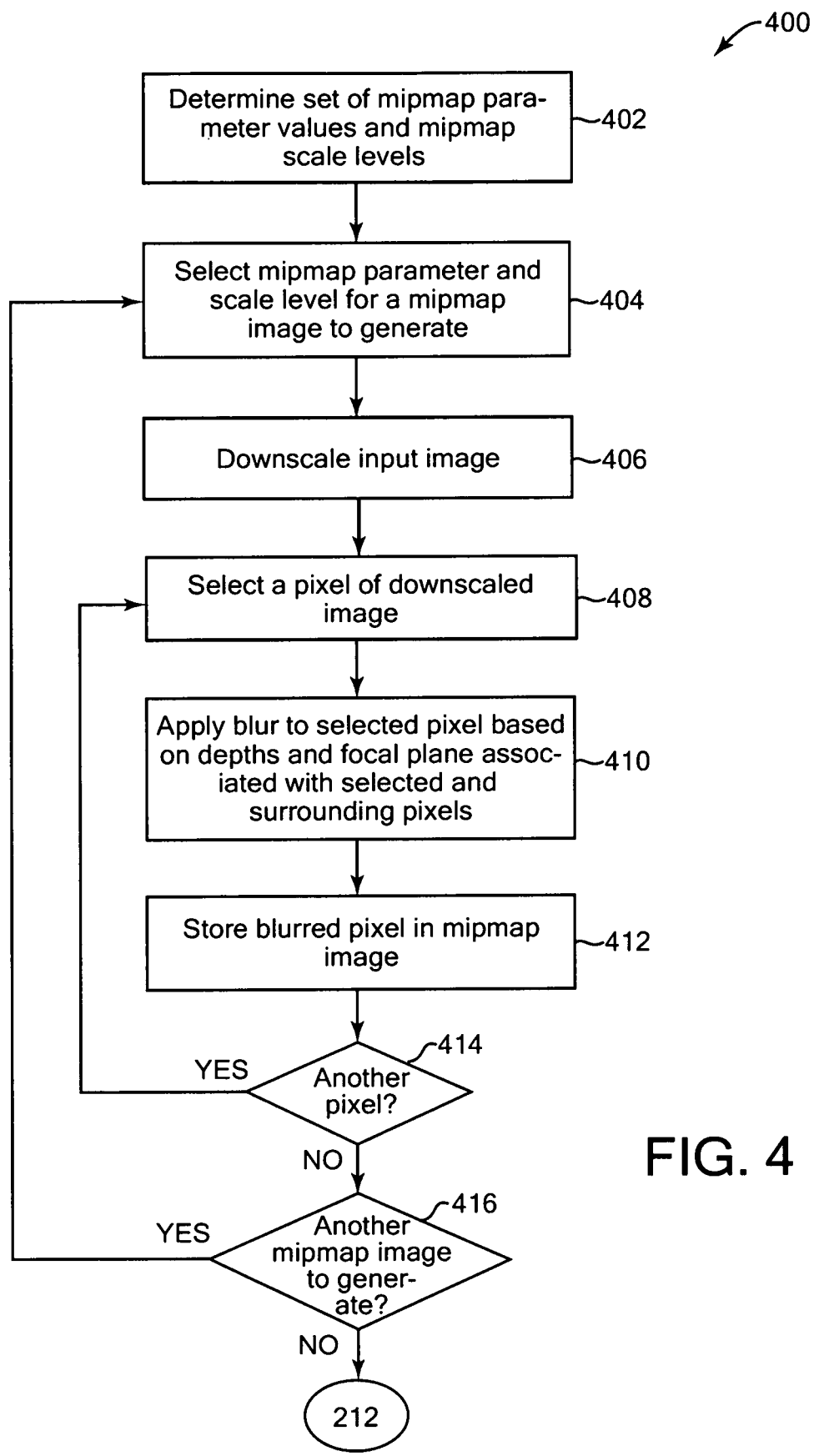
FIG. 4 is a flow diagram illustrating an example method to generate mipmap images, according to some implementations.

FIG. 4 is a flow diagram illustrating an example method 400 to generate mipmap images, according to some implementations. In some implementations, method 400 can be used in block 210 of FIG. 2. User consent is obtained for the blocks of method 400, similarly as described for FIG. 2.

In block 402, a set of mipmap parameter values and mipmap scale levels are determined for mipmap images to be generated. In some implementations, the set includes a set of background mipmap parameter values and background mipmap scale levels, and a set of foreground mipmap parameter values and foreground mipmap scale levels. In various implementations, the background values and levels can be the same as the foreground values and levels, or the values and/or levels can be different in the background and foreground sets.

In some implementations, this block determines the set of mipmap images to be generated. In some implementations, a mipmap parameter value is associated with each mipmap image to be generated. The parameter value indicates a parameter that is looked up by the output pixel determination process to select mipmap images and determine blurred pixel values. In some implementations, e.g., for background mipmap images, the parameter value can be a blur level associated with the mipmap image, which indicates an amount of blur applied to pixels of the associated mipmap image (e.g., 50%, 25%, etc.). In some implementations, e.g., for foreground mipmap images, the parameter value can be a foreground focal depth value that indicates a depth of a foreground plane used in the blurring of pixels in the associated mipmap image (e.g., 0.15, 0.3, etc.). An example of the use of the parameter value in selecting mipmap images for rendering output pixels is described with reference to FIG. 6.

Each mipmap parameter value is also associated with a scale level that indicates the amount of downscaling to apply to the input image when generating the associated mipmap image. In some examples, a mipmap scale level can be designated as 0.5 to indicate that the associated mipmap image is half the width and half the height of the input image, 0.25 to indicate one-quarter the width and one-quarter the height, etc.

In some implementations, a mipmap parameter can be provided which corresponds to a blur level of 0%, e.g., no blurring. In addition, such a parameter can be associated with a scale level of 1, such that the associated generated mipmap image will have the same resolution as, and is not downscaled from, the input image. Such a 0-level mipmap parameter can provide a 0-level mipmap image that is stored in storage similarly to any other mipmap image. For example, the 0-level mipmap image can be selected for use during rendering of a pixel on the focal plane and/or a pixel within the focal range, as described below in some implementations. A pixel having this focal plane depth value does not itself contribute blur to the corresponding output pixel value, but there may be foreground pixels near to the pixel that are blurred and can contribute to that output pixel blur, and this foreground blur contribution can be included in the pixels of the 0-level mipmap image.

Figure 5:
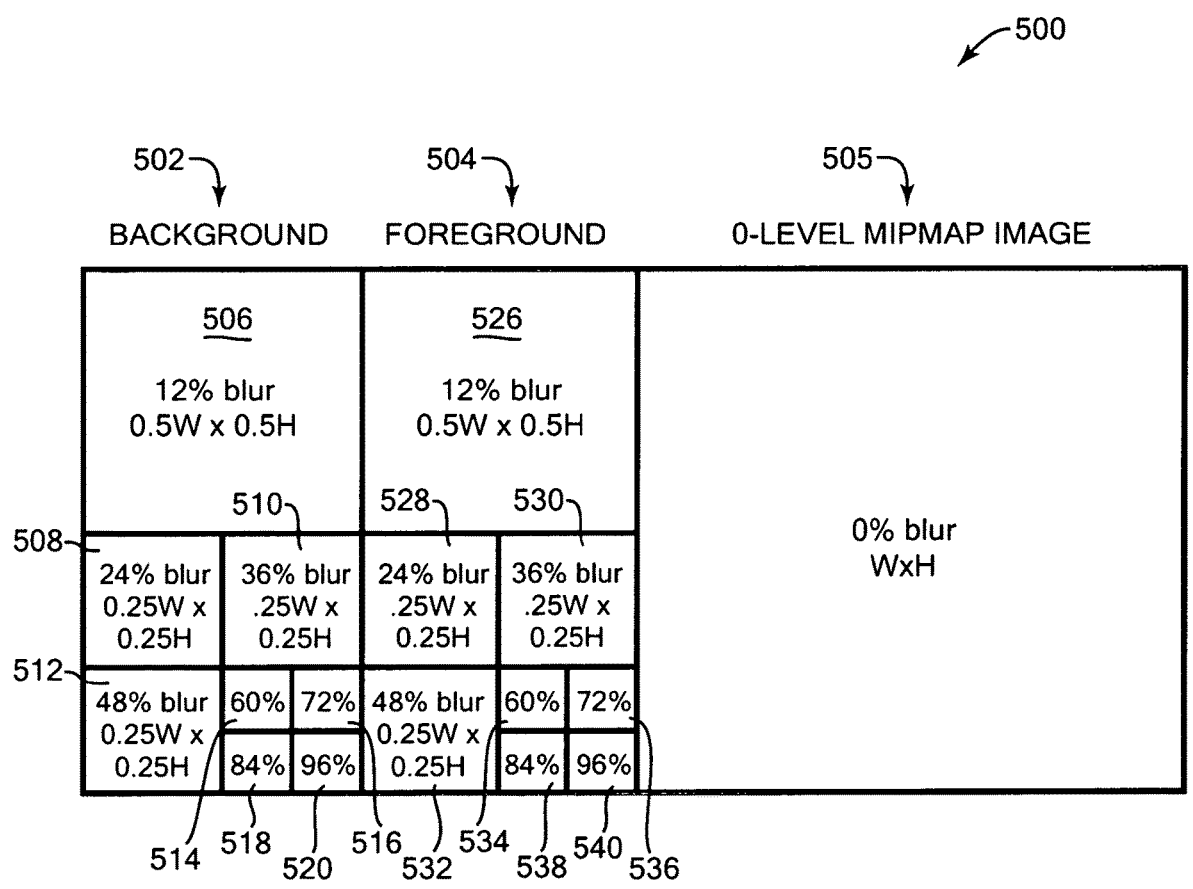
FIG. 5 is a diagrammatic illustration of an example set of generated mipmap images, according to some implementations.

The set of mipmap parameter values and associated scale levels to be used in the blurring of the input image can be obtained by method 400, e.g., from storage, default or user preferences, etc., or can be determined based on one or more image characteristics (image features detected in the image, timestamp and/or location of capture of the image, etc.). In one example, e.g., as shown in FIG. 5, the set of mipmap levels can include 0.5, 0.25, and 0.125, with one or more mipmap images at each of the mipmap levels. Other parameter values and/or scale levels can be used for mipmap images in various implementations, e.g., 0.33, 0.20, etc. In some implementations, the number of mipmap images and/or the scale levels to be used can be based on the amount of memory or other storage available to store the mipmap images, and/or based on processing speed or other capabilities of a device.

In block 404, a mipmap parameter value (and its associated mipmap scale level) is selected for which a mipmap image is to be generated. For example, the next mipmap parameter value for which a mipmap image has not yet been generated can be selected from the set of mipmap parameter values determined in block 402. In this example, the mipmap parameter level is a blur level.

In some implementations, multiple types of mipmap images are generated for a particular parameter value. In some examples, types of mipmap images includes a background mipmap image and a foreground mipmap image. For example, background mipmap images can be generated to include blurred pixel values for background pixels, e.g., pixels that are in the background of the input image (behind the focal plane of the input image). Foreground mipmap images can be generated to include blurred pixel values for foreground pixels, e.g., pixels that are in the foreground of the input image (e.g., in front of the focal plane of the input image and outside of a focal range of the input image).

In block 404, one type of mipmap image can be selected for generation. In some examples, a background type of mipmap image can be selected for the current iteration of method 400, or a foreground mipmap image can be selected.

In block 406, the input image is downscaled to provide a downscaled image, e.g., by a factor corresponding to the selected mipmap scale level. For example, if the selected scale level is 0.5, then the input image is downscaled such that the downscaled image has half the number of pixels in its width and its height. In some implementations, a previously-downscaled image (at the same scale level) can be used instead of performing the downscaling. For example, the previously-downscaled image can be a result from a previous iteration of block 406 for a different mipmap image.

In block 408, a pixel of the downscaled image is selected for processing, e.g., a pixel that has not yet been processed. The selected pixel can be considered the origin pixel for the blur process.

In block 410, blur is applied to the selected pixel based on depths of the selected and surrounding pixels of the downscaled image and based on a focal plane associated with the selected pixel (e.g., a focal plane calculated from the depth value of the selected pixel). A blur equation can be used to determine the blurred pixel color value. In some examples, the blur equation can sample pixels of the downscaled image that surround the selected pixel and are within a particular pixel distance to the selected pixel. In some examples, the particular pixel distance can be equal to the maximum blur radius, e.g., N in the graph 300 of FIG. 3. For example, the blur equation can multiply determined weights by sampled pixels, sum the weighted sampled pixels, and provide a weighted average pixel value as a blurred pixel value.

In some implementations, the blur equation can use the depths of sampled surrounding pixels (that surround the selected pixel in the downscaled image) to influence the amount of blur, e.g., influence the weight used in the blur equation. The depth value of a pixel indicates its position in the depth dimension extending into the downscaled image, e.g., perpendicular to the plane of the downscaled image. In some implementations, depth values can be obtained from a depth map associated with the input image, which indicates a depth value of each pixel of the input image. For example, in various implementations, the depth values may have originated from a capture device (e.g., depth camera) that senses and provides depth information for pixels of captured images. Depth values may have originated from an image processing technique that detects objects depicted in an image and estimates depths of the objects' pixels based on relative sizes of objects, types of objects, and other image characteristics. In some implementations, depth values may have originated from other sources. If a downscaled image pixel corresponds to multiple pixels in the input image that have different depths, any of a variety of techniques can be used to determine the depth of the downscaled image pixel, e.g., the depth map can be scaled to match the dimensions of the downscaled image using the same scaling technique, such that multiple pixel depths are averaged to downscale to one pixel depth.

In some implementations, the blur equation can use the depth of a focal plane that is associated with the selected pixel, when processing the selected pixel and surrounding pixels. In an example implementation, each pixel of a mipmap image is associated with a particular focal plane depth that would provide the blur amount of the mipmap blur level (parameter value) of the mipmap image at the depth of that pixel. Thus, per mipmap image, the amount of blur (blur level) is constant and the focal plane is changed per pixel to provide that blur level.

In some implementations, a difference between generating a background mipmap image and a foreground mipmap image is the method of determination of the focal planes ("normal" focal planes) and the foreground focal planes associated with the pixels of the mipmap image. In some implementations, if the selected type of the mipmap image being generated is a background mipmap image, the selected pixel can be treated as a background pixel for determining the focal plane and foreground focal plane. If the selected type of mipmap is a foreground mipmap image, the selected pixel can be treated as a foreground pixel for determining the focal plane and foreground focal plane.

For example, if the selected mipmap image is a background mipmap image, the associated normal focal plane of the selected pixel can be determined based on the depth of the selected pixel and based on the blur level assigned to the background mipmap image. The associated normal focal plane is determined from these parameters based on the particular background blur curve used to determine the blur equation to blur background pixels. For example, if the background blur curve is linear (as in the example of FIG. 3), then the difference between the depth of the selected pixel and the blur level of the selected background mipmap image can be used to determine the focal plane depth for the selected pixel. In some implementations, the background blur curve is based on a different relationship (e.g., exponential, or otherwise nonlinear), and the associated normal focal plane is determined based on the pixel depth and blur level using the background blur curve relationship.

For a background mipmap image, a foreground focal plane associated with the selected pixel is also determined, so that blur from qualifying foreground pixels that surround the selected pixel can contribute to the blur of the selected pixel. For example, in the linear blur curve example above, the foreground focal plane associated with a surrounding foreground pixel can be determined as the normal focal plane minus the focal range, where the normal focal plane is determined as described above for the background mipmap image. In some examples using the method of FIG. 6, the focal range is associated with the input image and can be a predetermined focal range used for all pixels of the generated mipmap images.

If the selected mipmap image is a foreground mipmap image, the associated foreground focal plane of the selected pixel can be determined for use in determining the blur of foreground pixels for the selected mipmap image. For example, the associated foreground focal plane of the selected pixel for the foreground mipmap image can be based on the selected pixel depth and the blur level assigned to the foreground mipmap image. The associated foreground focal plane is determined from these parameters based on the particular foreground blur curve used to determine the blur equation to blur foreground pixels. For example, if the foreground blur curve is linear (as in the example of FIG. 3), then the depth of the selected pixel plus the blur level of the selected foreground mipmap image can be used to determine the foreground focal plane depth for the selected pixel. In some implementations, the foreground blur curve is based on a different relationship (e.g., exponential, or otherwise nonlinear), and the associated foreground focal plane is determined based on the pixel depth and blur level using the foreground blur curve relationship.

For a foreground mipmap image, a normal focal plane associated with the selected pixel is also determined, since blur from background pixels that surround the selected pixel may be visible and contribute to the blur of the selected pixel (e.g., background pixels that are positioned behind semi-transparent blurred foreground pixels). For example, in the linear blur curve example above, the normal focal plane associated with a surrounding background pixel can be determined as the foreground focal plane plus the focal range, where the foreground focal plane is determined as described above for a foreground mipmap image.

An example blur equation that can be used to apply blur is as follows:

$$f(x, y) = \sum_{i=-N}^{N} \sum_{j=-N}^{N} w\left(\sqrt{i^2 + j^2}, |D_{x+i,y+j} - d_f|\right) \cdot T_{x+i,y+j}$$

where $$w(r, d) = \frac{1}{\pi(dN)^2}$$

if $r \leq dN$, 0 otherwise; where w is the weight, r is the distance (radius) from the current pixel to the origin pixel, and d is the output of the blur curve; D is the depth value of the current sampled pixel (e.g., from a depth map); $d_f$ is the focal plane depth value of the selected (origin) pixel; T is the current sampled pixel of the downscaled image; and N is a maximum radius. Other blur equations can be used in other implementations.

The weighting function w uses both the distance between a current sampled pixel and the origin (selected) pixel (the r term), as well as the pixel depth deviation (difference between depth of the current sampled pixel and focal plane of origin pixel) (the d term) as inputs to determine a weight of the current sampled pixel as used in the blur function. In this example, the depth deviation of a pixel (d term) determines the blur radius r to use for that pixel and thus determines whether the pixel can contribute to the blur or will be a zero value. For example, the greater a depth deviation for a sampled pixel, the greater the distance that pixel can be located from the selected pixel and still contribute to the blur of the selected pixel. Furthermore, the depth deviation of a pixel determines the weight of the sampled pixel, e.g., the greater the depth deviation (the further from the focal plane a pixel is), the smaller its weight (contribution) to the blur due to its light being spread across a greater number of pixels.

The weighting function w includes the d term $(D_{x+i,\ y+j}-d_f)$, which indicates the use of a linear blur curve such that the weight varies linearly based on the difference between current pixel depth and focal plane depth of the origin pixel. A nonlinear blur curve can use a different weighting and blur equation.

When determining the focal plane term $d_f$ in the blur equation to determine the contribution (weight) of a current sampled pixel, the background or foreground status of the current sampled pixel indicates whether to use the normal focal plane of the origin pixel or the foreground focal plane of the origin pixel, respectively, for this focal plane term. The normal focal plane and foreground focal plane are determined for the selected origin pixel as described above. A current sampled pixel is indicated to be in the background or in the foreground based on the selected mipmap blur level, the depth of the current sampled pixel, and the focal plane depth associated with the origin pixel. For example, if the current sampled pixel is indicated to be in the background due to having a depth behind the focal plane of the origin pixel, the normal focal plane depth is used for the focal plane term in the blur equation. If the current sampled pixel is indicated to be in the foreground due to having a depth in front of the foreground focal plane of the origin pixel, the foreground focal plane is used for the focal plane term in the blur equation.

In some implementations, the maximum radius N can be selected to be a maximum possible radius of a blurred disc (or other shape) for the determined bokeh effect. The parameter N can be a constant for the blurring of all pixels in the input image, for example, which can reduce or eliminate occlusion issues in which blur contributions of surrounding blurred foreground pixels may not be included in blur results (e.g., if a blur radius of zero were to be used for pixels on the focal plane). The use of the maximum radius N allows surrounding pixels within a particular pixel distance of the selected pixel to contribute their values to the blur, while pixels outside this maximum radius contribute nothing. This allows a circle bokeh effect to be provided, of a size based on the maximum radius. In other implementations, bokeh effects having different shapes can be provided, e.g., hexagons, squares, etc. A different relationship and one or more maximum distances can be provided in such implementations such that only surrounding pixels within an area having the indicated shape around the selected pixel will contribute their values to the blur.

The focal plane is determined based on the pixel depth and the mipmap blur level as described above. This determination may assume that a restriction is in place, that the blur curve used in the blur equation does not change shape as the focal plane depth changes. Within such a restriction, the blur curve can vary as to which depths it applies (e.g., varies by translation on the horizontal axis in the example graph 300 of FIG. 3), but the blur curve itself does not change in shape or size (nor changes vertically in the graph of FIG. 3). Using such a restriction, the focal plane can be deduced on a per pixel basis. For example, if a 50% blur level background mipmap image is being generated and the selected pixel has a depth value of 0.75, the selected pixel of the mipmap image will be accessed if the focal plane is 0.25, assuming a linear blur curve.

The blur equation used for generating blur for a background mipmap image may be different than the blur equation used for generating blur for a foreground mipmap image. The blur curve used does not change for any of the mipmaps of the same type (background or foreground), although may vary as to the depths applied as described above.

Since each mipmap image corresponds to a different amount of blur (blur level), a single output image can query from several different mipmap images, where the choice of which mipmap image to use per pixel is calculated from the depth deviation of that pixel.

In particular prior techniques that create blurred discs from a pixel to simulate a bokeh effect, several outputs are provided as a function of a single input, e.g., where the outputs are blurred pixel values of surrounding pixels based on the single input origin pixel. Using the described technique, a single output (the blurred value of the selected pixel) is the function of several inputs (the pixel values of surrounding pixels). The blurred pixel value (output) can be stored in the mipmap image and accessed with an efficient lookup function, as described below.

In some implementations, some pixels in mipmap images may become useless. For example, in a mipmap image having a 100% blur level, a pixel that does not have a depth value of 1.0 is useless since any pixel not on the farthest plane from the front image plane (camera) could never be 100% blurred (unless the focal plane is allowed to be behind the camera). The number of useless pixels may increase as the blur level of the mipmap images increases. In some implementations, high blur level mipmap images can be omitted and lower blur level mipmap images used such that the amount of useless pixels can be reduced.

In block 412, the generated blurred pixel of block 414 is stored as part of the selected mipmap image, e.g., a background mipmap image or foreground mipmap image. In some implementations, the generated mipmap image is stored as part of a texture, e.g., an OpenGL texture. The generated mipmap image can be stored adjacent to other generated mipmap images, e.g., to conserve storage space. An example of a set of mipmap images for the implementation of FIG. 4, including foreground and background mipmap images, is shown and described with reference to FIG. 5. In various implementations, the layout of the mipmap images can vary, e.g., can be tuned based on storage space occupied vs. quality (resolution) of the images.

In block 414, it is determined whether there is another pixel of the downscaled image to process for the selected mipmap image. If so, then the method returns to block 408 to select a different pixel (e.g., the next pixel) of the downscaled image to blur. If there are no additional pixels to process, then in block 416 it is determined whether there is another mipmap image to generate. For example, it is determined if there are mipmap parameter values and/or types of mipmap images (e.g., background or foreground) that have not yet had mipmap images generated. If so, then the method returns to block 404 to select one of these mipmap parameter values and/or mipmap image types for processing. In various implementations of method 400, background mipmap images and foreground mipmap images can be generated at least partially in parallel (e.g., multiple parallel processes of blocks 408-412), or can be generated in a sequential manner.

Figure 6:
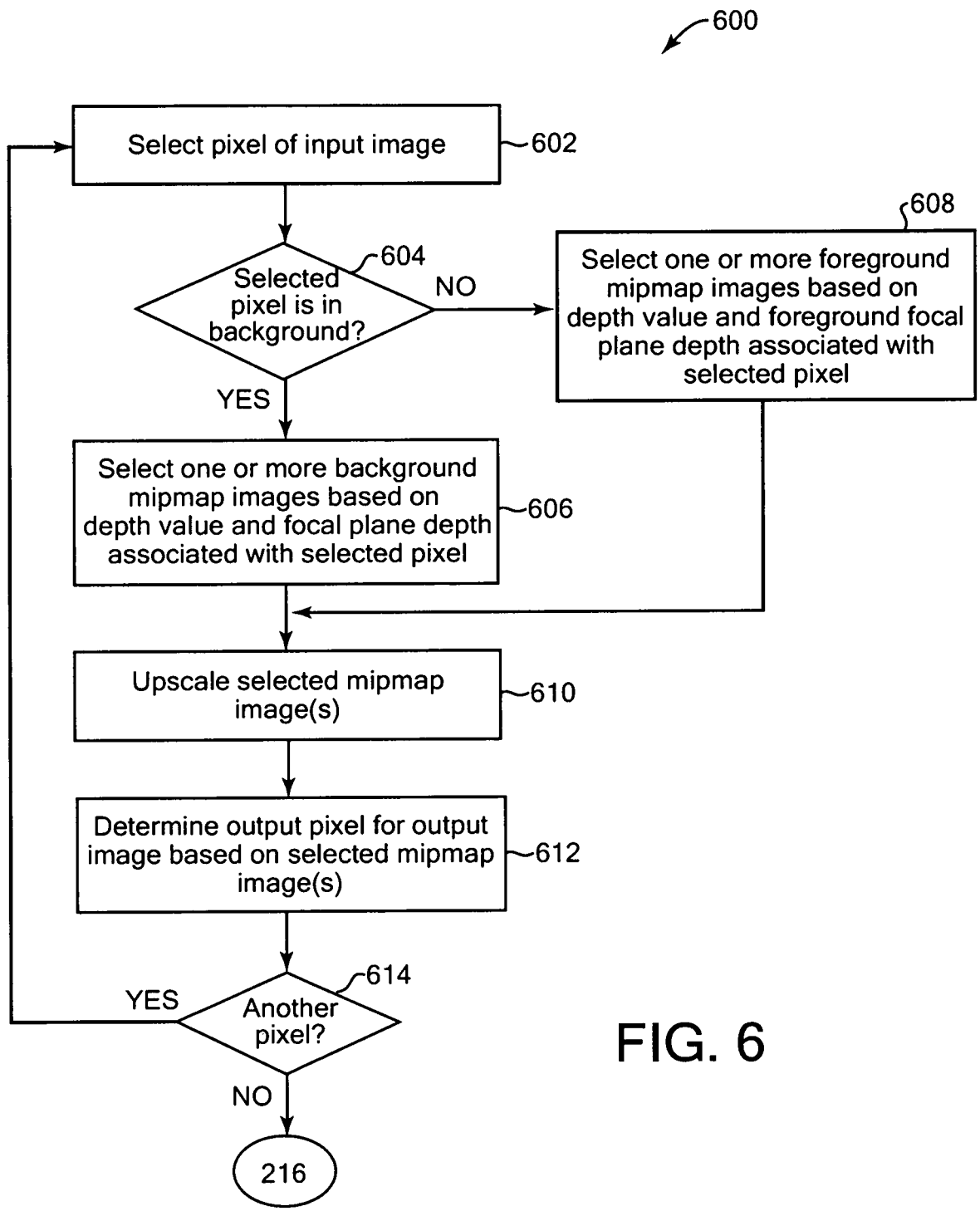
FIG. 6 is a flow diagram illustrating an example method to generate a blurred output image, according to some implementations.

If there are no more mipmap images to generate in block 416, e.g., all of the background and foreground types of mipmap images have been generated for each mipmap parameter value in the set of mipmap parameter values determined in block 402, then the method continues in a main process to provide a blurred output image based on the generated mipmap images. For example, the method can return to block 212 (or block 214) of FIG. 2 to determine a blurred output image. FIG. 6 describes example implementations for blurring using mipmap images as generated in the implementations of FIG. 4.

FIG. 5 is a diagrammatic illustration of an example set 500 of generated mipmap images that can be used in some implementations. In some examples, the set 500 can be generated in an implementation using the mipmap generation method 400 of FIG. 4, or similar method.

In this example, the set 500 includes generated mipmap images that have been stored in contiguous memory locations to provide a single overall image or texture. The set 500 includes a set of background mipmap images 502, a set of foreground mipmap images 504, and a 0-level mipmap image 505. The background mipmap images have been generated for use in determining blur for background pixels in an output image, the foreground mipmap images have been generated for use in determining blur for foreground pixels in the output image, and the 0-level mipmap image has been generated for use in determining blur for pixels having a depth value equal to the focal plane depth.

In this example, mipmap levels of 0.5, 0.25, and 0.125 are shown. For the background mipmap images 502, mipmap image 506 is scaled to the scale level of 0.5 and has an associated blur level (parameter value) of 12%, indicating the strength of the blur. Mipmap images 508, 510, and 512 are scaled to the scale level of 0.25 and have an associated blur level of 24%, 36%, and 48%, respectively. Mipmap images 514, 516, 518, and 520 are scaled to the scale level of 0.125 and have an associated blur level of 60%, 72%, 84%, and 96%, respectively.

Similarly, for the foreground mipmap images 504, mipmap image 526 is scaled to the scale level of 0.5 and has an associated blur level of 12%. Mipmap images 528, 530, and 532 are scaled to the mipmap level of 0.25 and have an associated blur level of 24%, 36%, and 48%, respectively. Mipmap images 534, 536, 538, and 540 are scaled to the mipmap level of 0.125 and have an associated blur level of 60%, 72%, 84%, and 96%, respectively.

The maximum blur level, associated with mipmap images 520 and 540, is below the maximum possible level of 100% in the example implementation of FIG. 5. This feature may reduce the processing and storage of seldom used pixels, since a 100% blur is typically rarely used in images and is not distinguishable from a smaller blur level such as 96%. Other implementations can use other maximum blur levels.

The 0-level mipmap image 505 can be included in some implementations. This mipmap image is scaled to a scale level of 1 (e.g., no downscaling has been performed from the input image) and has an associated blur level of 0%. The 0-level mipmap image can be selected to render pixels that have a depth equal to the focal plane depth and/or pixels having a depth value within the focal range of the output image. A pixel having this focal plane depth value does not contribute to other output pixels around it, but it does contribute to its own corresponding output pixel value. There may be foreground pixels near to the pixel that are blurred and can contribute to that output pixel blur, and this foreground blur contribution can be included in the pixels of the 0-level,mipmap image 505.

FIG. 6 is a flow diagram illustrating an example method 600 to generate a blurred output image, according to some implementations. For example, the generated blur can simulate a bokeh blur. In some implementations, method 600 can be used in block 214 of FIG. 2. In some implementations, method 600 can be performed in association with a user interface that displays an image and controls to adjust blur parameters based on user input. User consent is obtained for the blocks, similarly as described for FIG. 2.

In block 602, a pixel of the input image is selected for processing to generate a corresponding output pixel of the output image. The method continues to block 604.

In block 604, it is determined whether the selected pixel is a background pixel. In some implementations, this can be determined based on the depth value of the selected pixel (e.g., as obtained from a depth map or as other stored depth value associated with the selected pixel and input image) and the focal plane depth of the output image (obtained, for example, from blur parameters obtained for the output image, e.g., based on user input or from stored data). In some examples, the selected pixel is a background pixel if it has a depth behind the focal plane (e.g., further from the front plane of the image than the focal plane).

If the selected pixel is not a background pixel, then it is considered a foreground image and the method continues to block 608, described below. If the selected pixel is a background pixel, the method continues to block 606, in which one or more background mipmap images are selected based on the depth value of the selected pixel and based on an output focal plane depth for the output image. The output focal plane depth can be (or be based on) a blur parameter for the output image, e.g., obtained in block 212 of FIG. 2.

The one or more background mipmap images can be selected based on the blur curve used in creating the background mipmap images. For example, if the blur curve is linear, then the difference between the selected pixel depth and the output focal plane depth can be determined as a lookup value, and the blur levels of the background mipmap images are searched to find a match to the lookup value. If the blur curve is not linear, the nonlinear relationship between pixel depth and output focal plane depth is used to determine the lookup value. One or more background mipmap images associated with the blur level(s) that match the lookup value are selected. In some cases, the lookup value is between two of the blur levels of the background mipmap images, and in some examples, the two background mipmap images having blur levels that (e.g., most closely) surround the matching lookup value are selected. In some examples, one or more background mipmap images are selected which have a respective mipmap blur level that is closest among the plurality of mipmap images to the lookup value. The method continues to block 610, described below.

If in block 604 it is determined that the selected pixel is not a background pixel, then the method continues to block 608 from block 604. In block 608, one or more foreground mipmap images are selected based on the depth value of the selected pixel and based on a determined foreground focal plane depth associated with the selected pixel. The foreground focal plane depth is determined based on the focal plane depth and a focal range. For example, the focal plane depth minus the focal range can provide the foreground focal plane depth. The focal range can be a blur parameter that is obtained by method 600 similarly to other blur parameters as described above.

The foreground mipmap image(s) can be selected based on the blur curve used in creating the foreground mipmap images. For example, if the blur curve is linear, then the difference between the pixel depth and the foreground focal plane depth can be determined as a lookup value, and the blur levels of the foreground mipmap images are searched to find a match to the lookup value. The foreground mipmap image associated with the matching blur level is selected. In some cases, the lookup value is between two of the blur levels of the foreground mipmap images, and in some examples, the two foreground mipmap images having blur levels that surround the matching lookup value are selected.

In this example, if the selected pixel is not a background pixel, it is a foreground pixel. In some cases, the foreground pixel may be located in the focal range, e.g., between the focal plane and the foreground focal plane. In some implementations, such foreground pixels can cause selection of a 0-level mipmap image, examples of which are described herein with reference to FIGS. 4 and 5. The method continues to block 610.

In block 610, the selected mipmap image(s) are upscaled to the resolution of the input image. This upscaling causes additional blur to the pixels of the selected background or foreground mipmap image(s). In some implementations, additional processing can also be provided to the background or foreground mipmap images. For example, an additional Gaussian blur can optionally be added to smooth the image, a denoising technique can optionally be implemented to remove artifacts introduced by the upscaling, etc. The method continues to block 612.

In block 612, an output pixel is determined for the output image based on the selected mipmap image(s). For example, the output pixel can be assigned the corresponding pixel value of the selected, upscaled mipmap image. In some implementations, if two mipmap images were selected in block 606 and/or 608, then the output pixel can be assigned a pixel value that is interpolated between corresponding pixel values of the two mipmap images.

In some implementations, additional and/or other processing can be performed to determine the output pixel. For example, there may be a blur strength parameter that was obtained to adjust the overall blur provided in the output image. In some examples, a blur strength parameter has been obtained in block 212 of FIG. 2. In some implementations, a constant blur curve is assumed when generating the mipmap images as described above with reference to FIG. 4, and if using such a restriction, the blur strength parameter is not applied as a multiplier of the mipmap level, since this may effectively modify the blur curve by changing the slope of the blur curve. Instead, the output pixel value for the output image can be determined as described above, as if the blur strength parameter is set to full blur, and then the blur strength parameter can be used to interpolate. For example, the blur strength parameter can be used to interpolate between that output pixel value and the corresponding input image pixel value to obtain the final output pixel value. In another example, several sets of mipmap images can be generated, with different blur curves used to generate each set, and the blur strength parameter can be used to interpolate between (e.g., two) corresponding output pixel values of corresponding mipmap images from different sets. For example, this may produce a higher quality image at the cost of more storage space required.

In block 614, it is determined whether another pixel for the output image is to be processed, e.g., whether any pixels remain in the input image that have not been processed into output pixels. If so, the method returns to block 602 to select the next pixel of the input image for processing and generation of a corresponding output pixel. In various implementations, all of the pixels of the input image, or a subset of the pixels of the input image, can be selected for processing in method 600.

If there are no more output pixels to process in block 614, e.g., all of the output pixels have been generated for the output image, then the method continues in a main process to provide the output image. For example, the method can return to block 216 of FIG. 2 to display the output image including the determined output pixels.

Figure 7:
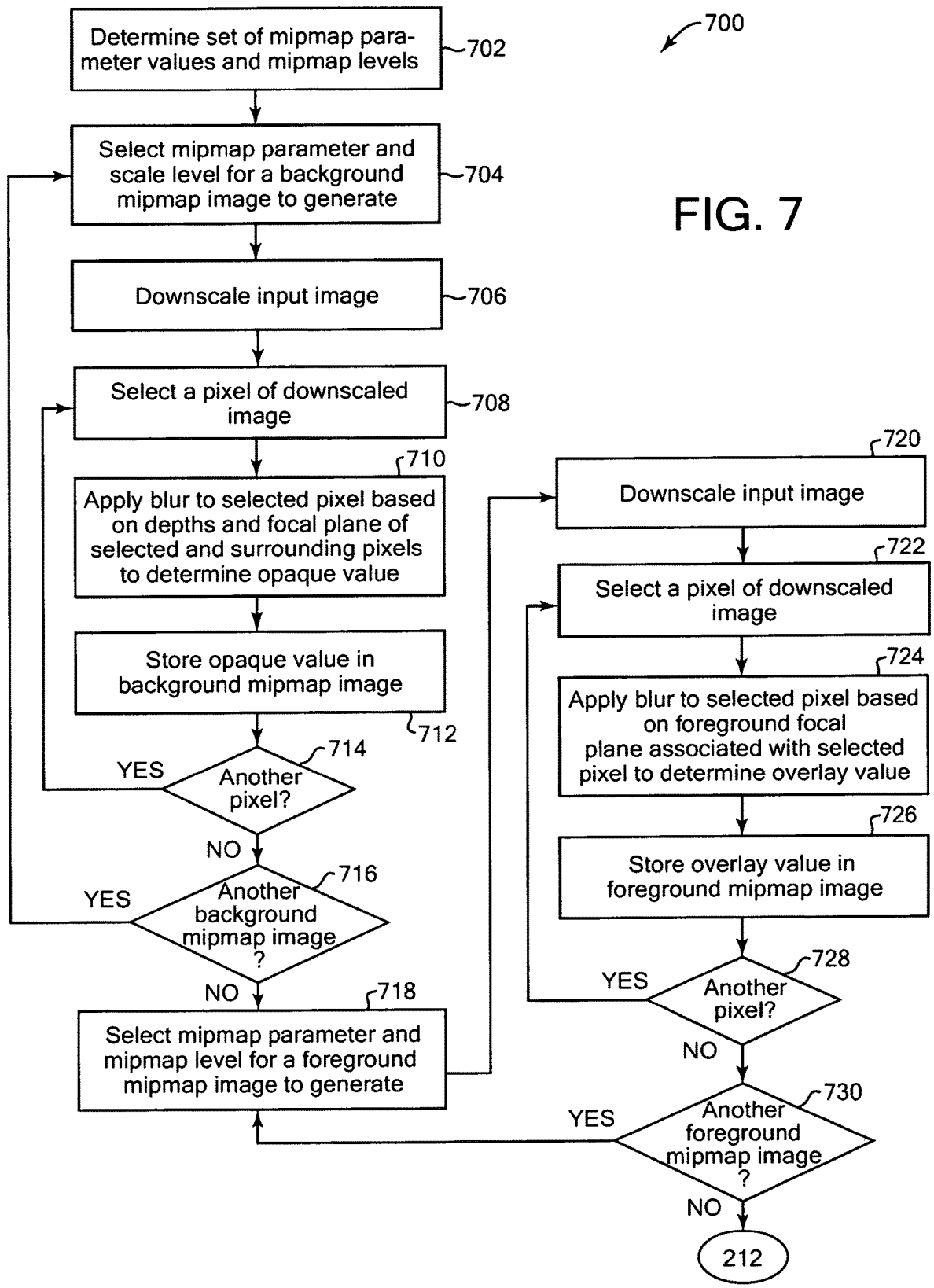
FIG. 7 is a flow diagram illustrating another example method to generate mipmap images, according to some implementations.

FIG. 7 is a flow diagram illustrating another example method 700 to generate mipmap images, according to some implementations. In some implementations, method 700 can be used in block 210 of FIG. 2. User consent is obtained for the blocks of method 700, similarly as described for FIG. 2. In method 700, mipmap images are generated that are suitable for use with a variable focal range, e.g., a focal range that can be adjusted as a blur parameter to cause output images to have varying foreground blur. Rendering of such output images is described below with respect to FIG. 9.

In block 702, mipmap parameter values and mipmap scale levels are determined for background and foreground mipmap images to be generated. This block can be performed similarly to block 402 of FIG. 4 as described above. In some implementations, this block determines the set of mipmap images to be generated. Each mipmap image to be generated is associated with a different mipmap parameter. The mipmap parameter value of this parameter is compared to a lookup value used to select mipmaps for use in blurring a pixel, as described below with respect to FIG. 9. In some implementations, e.g., for background mipmap images, the mipmap parameter value can be a blur level for the associated background mipmap image, which indicates an amount of blur applied to pixels of the associated mipmap image. In some implementations, e.g., for foreground mipmap images, the mipmap parameter value can be a foreground focal plane depth value that indicates a depth of a foreground plane used in the blurring of pixels in the associated mipmap image.

Figure 8:
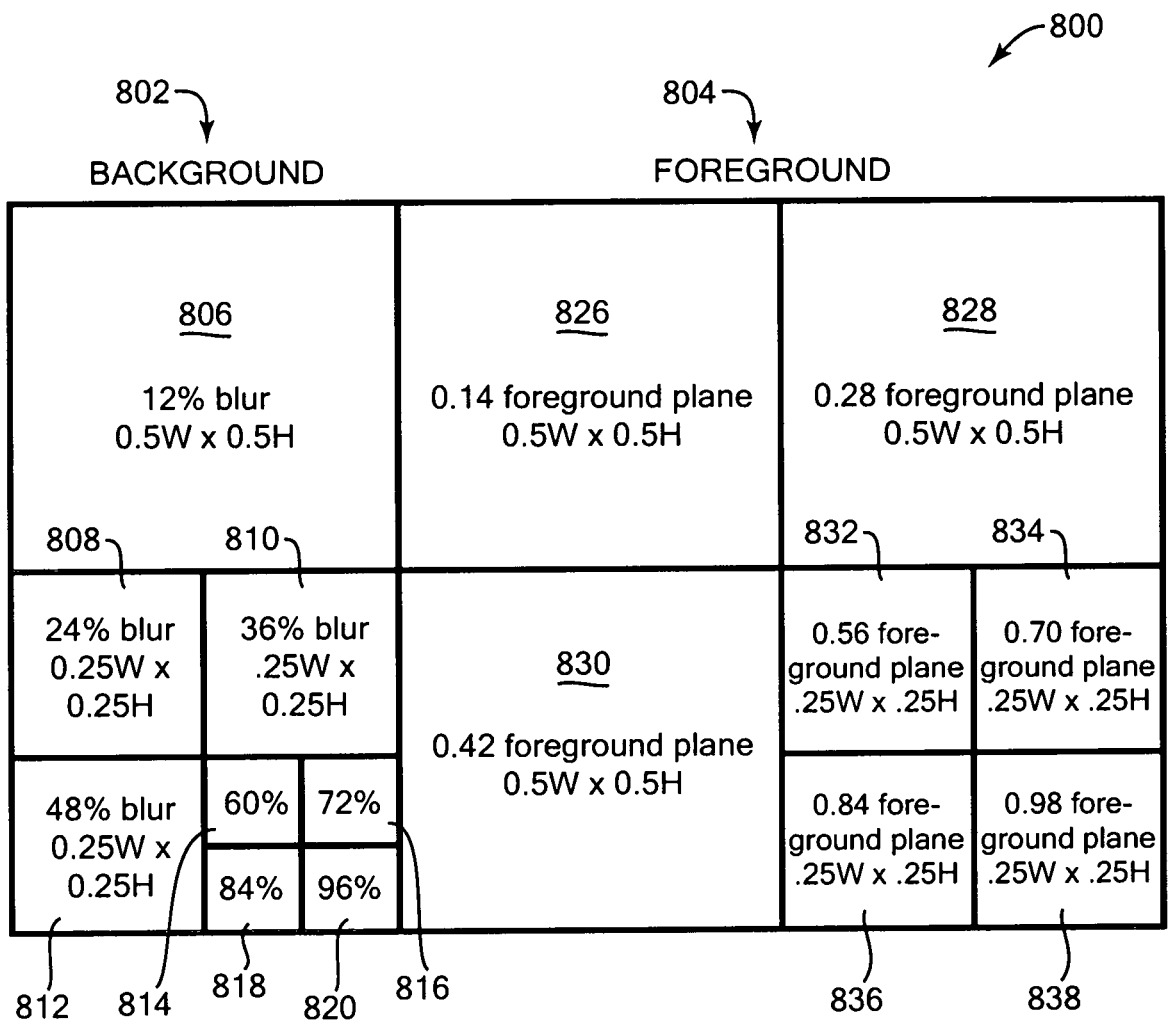
FIG. 8 is a diagrammatic illustration of another example set of generated mipmap images based on the method of FIG. 7, according to some implementations.

Each mipmap parameter value is also associated with a scale level that indicates the amount of downscaling to apply to the input image when generating the associated mipmap image. The set of mipmap parameter values and associated scale levels to be used in the blurring of the input image can be obtained by method 700, e.g., from storage, default or user preferences, etc., or can be determined based on one or more image characteristics similarly as described for FIG. 4. One example set of mipmap images having example mipmap parameters is shown in FIG. 8. Other parameter values and/or scale levels can be used for mipmap images in various implementations, e.g., 0.33, 0.20, etc. In some implementations, the number of mipmap images and/or the scale levels to be used can be based on the amount of memory or other storage available to store the mipmap images, and/or based on processing speed or other capabilities of a device.

In block 704, a mipmap parameter value (and associated mipmap scale level) is selected for which a background mipmap image is to be generated. For example, the next mipmap parameter value for which a background mipmap image has not yet been generated can be selected from the set of mipmap parameter values determined in block 702. In some implementations, one type of mipmap image can be selected for generation. In this example, a background type of mipmap image is selected at block 704, and so a background mipmap parameter value is selected. In this example implementation, the background mipmap parameter level is a blur level.

In block 706, the input image is downscaled to provide a downscaled image, e.g., by a factor corresponding to the selected mipmap scale level, similarly as in block 406 of FIG. 4. In some implementations, a previously-downscaled image (at the same scale level) can be used, e.g., from a previous iteration of block 706 for a different background mipmap image.

In block 708, a pixel of the downscaled image is selected for processing, e.g., a pixel that has not yet been processed. The selected pixel can be considered the origin pixel for the blur process.

In block 710, blur is applied to the selected pixel based on depths of the selected and surrounding pixels of the downscaled image and a focal plane associated with the selected pixel, to determine an opaque pixel value. A blur equation can be used to determine the blur amount. In some examples, the blur equation can sample pixels of the downscaled image that surround the selected pixel and are within a particular pixel distance to the particular pixel. In contrast to the blur applied in block 410 of FIG. 4, no foreground pixels (e.g., pixels having a depth at or in front of the focal plane) will influence the blur of the selected (background) pixel. This is because the blur effects from foreground pixels are determined for a separate set of foreground mipmap images, as described below. Thus, foreground pixel depth values are clamped to the focal plane in block 710 and do not contribute to the blur of the selected background pixel. An effect of the lack of contribution of foreground pixels is that a level-0 mipmap image need not be generated in the method 700, e.g., the input image can be used as a level-0 mipmap image.

In some implementations, the blur equation can use the depth values of sampled surrounding pixels to influence the amount of blur, and can use the depth of a focal plane that is associated with the selected pixel. The depth values can be obtained from depth information associated with the pixels of the input image, similarly as described above for FIG. 4. Additionally, foreground pixels can be considered in block 710 to have a depth value equal to the focal plane to reduce their contributions to zero as described above. Per mipmap image, the amount of blur is constant and the focal plane is changed per pixel to provide that constant amount of blur. The associated focal plane can be determined based on the depth of the selected pixel and based on the mipmap blur level assigned to the selected background mipmap image. The focal plane is determined from these parameters based on the particular blur curve used in the blur equation to blur pixels, similarly as described above for block 410 of FIG. 4. For example, if the blur curve is linear, then the difference between the depth of the selected pixel and the blur level of the selected background mipmap image is equal to the focal plane depth for the selected pixel. In some implementations, the blur curve uses a different relationship, and the associated focal plane is determined based on the pixel depth and blur level using the blur curve relationship.

In some examples, a blur equation that can be used can be similar to the blur equation described above for block 410 of FIG. 4. Similar parameters and implementations described in this block can be used for block 710, in some examples. For example, the restriction of an unchanging blur curve for the mipmap images can be applied as described above. Other blur equations can be used in other implementations.

The blurred pixel value determined by block 710 can be referred to as an opaque pixel value (or opaque pixel), which is in contrast to overlay pixel values determined for foreground mipmap images as described below.

In block 712, the generated blurred pixel value (opaque pixel value) of block 710 is stored as part of a background mipmap image. In some implementations, the generated background mipmap image is stored as part of a texture, e.g., an OpenGL texture. The generated background mipmap image can be stored adjacent to other generated mipmap images to conserve storage space. An example of a set of mipmap images, including foreground and background mipmap images according to the example implementation of FIG. 7, is shown and described with reference to FIG. 8.

In block 714, it is determined whether there is another pixel of the downscaled image to process for the selected background mipmap image. If so, then the method returns to block 708 to select a different pixel (e.g., the next pixel) of the downscaled image to blur. If there are no additional pixels in the downscaled image to process as determined in block 714, then in block 716 it is determined whether there is another background mipmap image to generate. For example, it is determined if there are blur levels determined in block 702 that have not yet had background mipmap images generated. If so, then the method returns to block 704 to select one of these mipmap blur levels for processing.

If there are no further background mipmap images to generate as determined in block 716, then in block 718, a mipmap parameter value is selected for which a foreground mipmap image is to be generated. For example, the next mipmap parameter value (and associated mipmap level) that have not yet been used to generate a foreground mipmap image can be selected from the set of mipmap parameter values determined in block 702.

In some implementations, for foreground mipmap images, the associated mipmap parameter can be a foreground focal plane value. The foreground focal plane value is the depth of the foreground focal plane for that mipmap image, and is equal to the focal plane value minus the focal range. Thus, each foreground mipmap image represents foreground blur at a particular foreground focal plane depth. For example, during rendering of foreground blur (e.g., described with respect to FIG. 9), a pixel value for a target foreground focal plane value can be determined by interpolating between the corresponding pixels of two foreground mipmap images having foreground focal plane values surrounding the target foreground focal plane value. In some implementations, the foreground blur curve in isolation is not bimodal (e.g., does not exist at depths on both sides of the focal plane), linearly interpolating between values of the foreground blur curve during rendering will not cause visual artifacts.

In block 720, the input image can be downscaled to provide a downscaled image, e.g., by a factor corresponding to the selected mipmap parameter value, similarly as in block 406 of FIG. 4 and block 706. In some implementations, a previously-downscaled image can be used, e.g., from a previous iteration of block 720 for a different mipmap image.

In some implementations, a greater number or percentage of the foreground mipmap images can be scaled to a higher resolution than the background mipmap images in a set of mipmap images if the foreground mipmap parameter represents a foreground focal plane value as described above, since there may be fewer blurred (or less-blurred) pixels in each foreground mipmap image than in each background mipmap image. In general, pixels in the mipmap images having a higher foreground focal plane depth value (further from the camera and closer to the focal plane) will be more blurred than pixels in mipmap images having lower foreground focal plane values, and some downscaling can still be used for these mipmap images. Furthermore, a 0-level mipmap image (shown in the example of FIG. 5) can be omitted, allowing more storage space for higher resolution mipmap images.

In block 722, a pixel of the downscaled image is selected for processing, e.g., a pixel that has not yet been processed. The selected pixel can be considered the origin pixel for the blur process.

In block 724, blur is applied to the selected pixel based on depths of the selected and surrounding pixels of the downscaled image and a foreground focal plane associated with the selected pixel, to determine an overlay pixel value. A blur equation can be used to determine the blur amount. In some examples, the blur equation can sample pixels of the downscaled image that surround the selected pixel and are within a particular pixel distance to the particular pixel. Block 724 determines a value of a foreground blur, which can be considered an overlay pixel value. The overlay pixel value can be combined with (e.g., overlaid on) a background blur value (or opaque pixel value) determined in block 710, as described with respect to FIG. 9, to determine the blurred output pixel value for the output image. Thus, the output blurred pixel resulting from block 724 can include a transparency channel (e.g., an alpha channel), which can be associated with a transparency value (e.g., translucent alpha value), such that the output pixel can potentially be combined with an opaque pixel.

In some implementations, the blur equation can use the depth values of the sampled surrounding pixels and can use the depth of the foreground focal plane that is associated with the selected foreground mipmap image, to influence the amount of blur. The depth of the selected pixel is obtained similarly as described above and the foreground focal plane value was selected in block 718 as the mipmap parameter value. In some examples, a blur equation that can be used can be similar to the blur equation described above for block 410 of FIG. 4. In some implementations, similar parameters and implementations described in block 410 can be used for block 724, e.g., using the foreground focal plane value for the focal plane term in the blur equation. The blur equation or blur curve used for generating blur for a foreground mipmap image may be different than the blur equation used for generating blur for a background mipmap image. Other blur equations can be used in other implementations.

In block 726, the generated blurred pixel value (overlay pixel value) of block 724 is stored as part of a foreground mipmap image. In some implementations, the generated foreground mipmap image is stored as part of a texture, e.g., an OpenGL texture. The generated foreground mipmap image can be stored adjacent to other generated mipmap images to conserve storage space. An example of an entire set of mipmap images, including foreground and background mipmap images according to the example implementation of FIG. 7, is shown and described with reference to FIG. 8.

In block 728, it is determined whether there is another pixel of the downscaled image to process for the selected foreground mipmap image. If so, then the method returns to block 722 to select a different pixel (e.g., the next pixel) of the downscaled image to blur. If there are no additional pixels in the downscaled image to process as determined in block 728, then in block 730 it is determined whether there is another foreground mipmap image to generate. For example, it is determined if there are mipmap parameter values (e.g., foreground focal plane values) in the set of mipmap parameter values that have not yet had foreground mipmap images generated. If so, then the method returns to block 718 to select one of these mipmap parameter values for processing.

Figure 9:
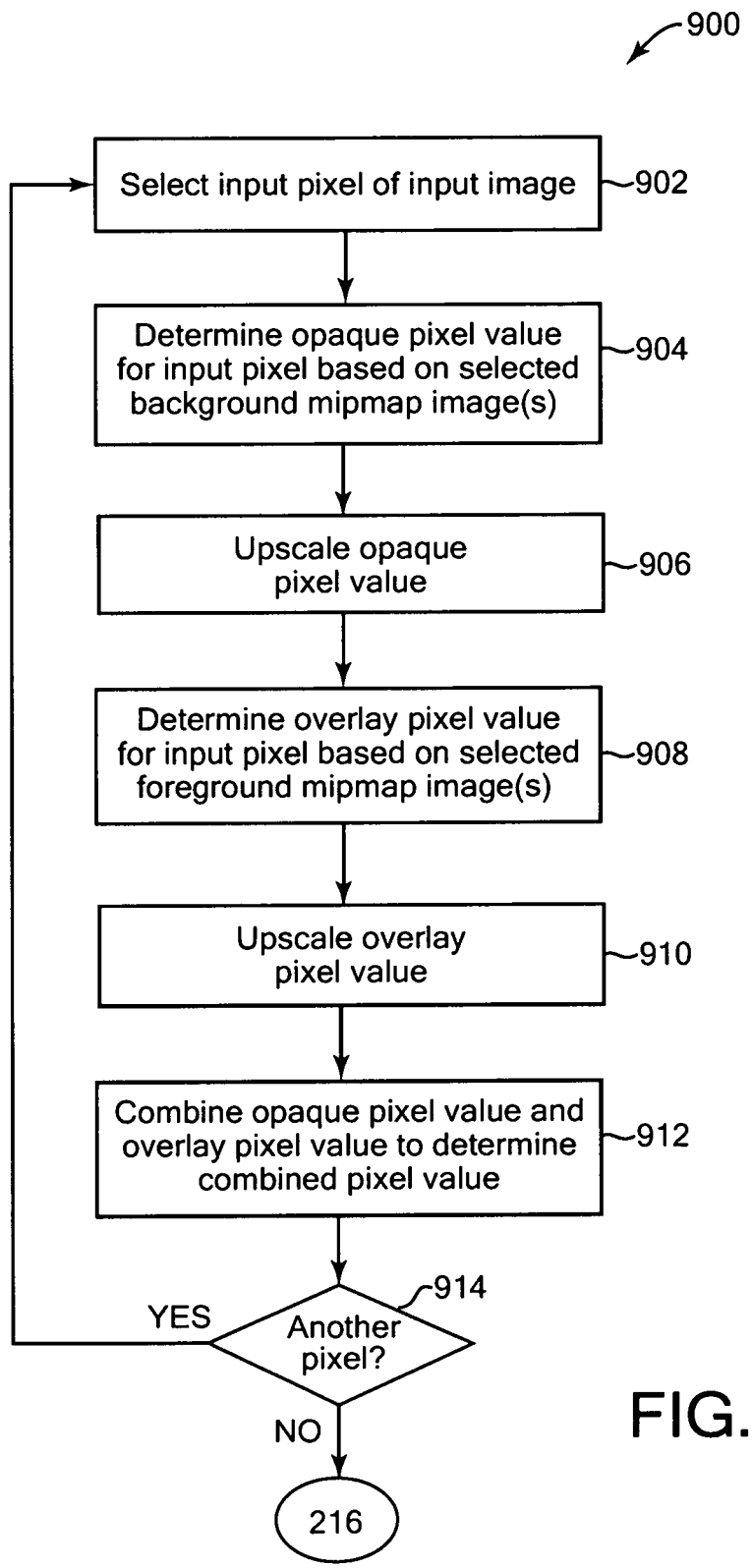
FIG. 9 is a flow diagram illustrating another example method to generate a blurred output image, according to some implementations.

If there are no more foreground mipmap images to generate in block 730, e.g., all of the background and foreground types of mipmap images have been generated for the set of mipmap parameter values determined in block 702, then the method continues in a main process to provide a blurred output image based on the generated mipmap images. For example, the method can return to block 212 or 214 of FIG. 2 to determine a blurred output image. FIG. 9 describes example implementations for blurring using mipmap images as generated in the implementations of FIG. 7.

FIG. 8 is a diagrammatic illustration of another example set 800 of generated mipmap images that can be used in some implementations. For example, the set 800 can be generated in an implementation using the mipmap generation method 700 of FIG. 7, or similar method.

In this example, the set 800 includes generated mipmap images that have been stored in contiguous memory locations to provide a single overall image or texture. The set 800 includes a set of background mipmap images 802 and a set of foreground mipmap images 804. The background mipmap images have been generated for use in determining blur contributed by background pixels in an output image, and foreground mipmap images have been generated for use in determining blur contributed by foreground pixels in the output image.

In this example, mipmap levels of 0.5 and 0.25, and 0.125 are shown. For the background mipmap images 802, mipmap image 806 is scaled to the mipmap level 0.5 and has an associated blur level of 12%, indicating the strength of the blur. Mipmap images 808, 810, and 812 are scaled to the mipmap level of 0.25, and have an associated blur level of 24%, 36%, and 48%, respectively. Mipmap images 814, 816, 818, and 820 are scaled to the mipmap level of 0.125, and have an associated blur level of 60%, 72%, 84%, and 96%, respectively.

In this example, the foreground mipmap images 804 do not have mipmap scale levels that correspond to the mipmap scale levels of the background mipmap images 802. The foreground mipmap images 804 may generally have higher resolution (higher mipmap scales) than do the background mipmap images, e.g., there are no foreground mipmap images in set 804 below the 0.25 mipmap level. In this example, foreground mipmap images 826, 828, and 830 are scaled to the mipmap level 0.5 and have an associated foreground focal plane value of 0.14, 0.28, and 0.42, respectively. Mipmap images 832, 834, 836, and 838 are scaled to the mipmap level of 0.25, and have an associated foreground focal plane value of 0.56, 0.70, 0.84, and 0.98, respectively.

The maximum parameter values are associated with mipmap images 820 and 838 and do not go to the maximum values of 100% and 1, respectively, in this example. This reduces the processing and storage of seldom used pixels, since such maximum values are typically rarely used in images and is not distinguishable from smaller values such as 96% and 0.98 in the example shown.

FIG. 9 is a flow diagram illustrating another example method 900 to generate a blurred output image, according to some implementations. For example, the generated blur can simulate a bokeh blur. In some implementations, method 900 can be used in block 214 of FIG. 2. In method 900, blurring is rendered in an output image based on blur parameters including a variable focal range, e.g., a focal range that can be adjusted to cause the output image to have varying foreground blur. In this example, method 900 can use mipmap images generated in the method 700 of FIG. 7.

In some implementations, method 900 can be performed in association with a user interface that displays an image and controls to adjust blur parameters based on user input. User consent is obtained for the blocks, similarly as described for FIG. 2.

In block 902, a pixel of the input image (e.g. input pixel) is selected for processing to generate a corresponding output pixel of the output image.

In block 904, an opaque pixel value is determined for the output pixel position that corresponds to the selected input pixel of the input image, where the opaque pixel value is based on one or more selected background mipmap images. The one or more background mipmap images are selected based on the depth value of the selected input pixel and based on an output focal plane depth for the output image. The output focal plane depth can be (or be based on) a blur parameter for the output image, e.g., obtained in block 212 of FIG. 2. The one or more background mipmap images can be selected based on the blur curve used in creating the background mipmap images. For example, if the blur curve is linear, then the difference between the selected pixel depth and the output focal plane depth can be determined as a lookup value, and the blur levels of the background mipmap images are searched to find a match to the lookup value, similarly as described for block 606 of FIG. 6. A background mipmap image associated with the blur level matching the lookup value is selected.

In some cases, the lookup value is between two of the blur levels of the background mipmap images, and in some examples, two background mipmap images having blur levels that (e.g., most closely) surround the matching lookup value are selected. In some implementations, if two background mipmap images are selected in block 904, then the opaque pixel value can be interpolated between corresponding pixel values of the two background mipmap images. In some implementations, if the pixel depth value is on the focal plane or within the focal range, the pixel from the input image can be used as the opaque value, and if the pixel depth value is in the foreground, a black color (e.g., value of all 0s) can be used as this opaque value (e.g., because all of the color information for foreground pixels is stored in the overlay value). The method continues to block 906.

In block 906, the opaque pixel value is upscaled from the resolution of the selected background mipmap image(s) to the resolution of the input image. This upscaling causes additional blur to the opaque pixel value. In some implementations, additional processing can also be provided to the opaque pixel value. For example, an additional Gaussian blur can optionally be added to smooth the pixel value, a denoising technique can optionally be implemented to remove artifacts introduced by the upscaling, etc. The method continues to block 908.

In block 908, an overlay pixel value is determined for the output pixel position that corresponds to the selected input pixel of the input image, where the overlay pixel value is based on one or more selected foreground mipmap images. The one or more foreground mipmap images are selected based on an output foreground focal plane depth associated with the selected input pixel. The output foreground focal plane depth is determined based on the output focal plane depth and a focal range for the output image. For example, the output focal plane depth minus the focal range can provide the output foreground focal plane depth. The output focal plane depth can be (or be based on) a blur parameter for the output image as described above. The focal range can also be (or be based on) a blur parameter for the output image. Such blur parameters can be obtained similarly as described above, e.g., in block 212 of FIG. 2.

The output focal foreground focal plane depth can be used as a lookup value for selecting foreground mipmap image(s). In some examples, the lookup value can be compared to the mipmap parameter values (e.g., mipmap foreground plane value) of the foreground mipmap images to find a match to the lookup value. The foreground mipmap image associated with the matching foreground plane value is selected.

In some cases, the lookup value is between two foreground plane values, and in some examples, two foreground mipmap images having the two foreground plane values that (e.g., most closely) surround the matching lookup value are selected. In some implementations, if two foreground mipmap images are selected in block 906, then the overlay pixel value can be interpolated between corresponding pixel values of the two foreground mipmap images. In some implementations, if it is determined that a foreground focal plane of 0 is to be used as the lookup value, a transparent black value (all zeroes) can be used as the mipmap value (e.g., because if the foreground focal plane is 0, no foreground pixels exist in the image). The method continues to block 910.

In block 910, the overlay pixel value is upscaled from the resolution of the selected foreground mipmap image(s) to the resolution of the input image. This upscaling causes additional blur to the overlay pixel value. In some implementations, additional processing can also be provided to the overlay pixel value. For example, an additional Gaussian blur can optionally be added to smooth the pixel value, a denoising technique can optionally be implemented to remove artifacts introduced by the upscaling, etc. The method continues to block 912.

In block 912, the opaque pixel value determined in block 904 and the overlay pixel value determined in block 908 are combined, e.g., mixed, to create a combined pixel value for the output image. In some implementations, the combining can include a blending of the pixel values based on a transparency value associated with the overlay value. For example, the input image can include transparency values (e.g., alpha values for alpha blending) as metadata for the pixels, and the blur equation of FIG. 7 may, along with modifying RGB values of a selected pixel, also modify the transparency value of the pixel to provide transparency for the pixel (e.g., if the weight determined for the pixel is less than 1 and greater than zero). In some examples, an alpha value of 0 indicates full transparency of the overlay pixel value such that only the opaque pixel value is used, an alpha value of 1 indicates no transparency such that only the overlay pixel value is used, and an alpha value of 0.5 indicates to average the opaque pixel value and overlay pixel value.

In some implementations, additional and/or other processing can be performed to determine the output pixel. For example, there may be a blur strength parameter that was obtained to adjust the overall blur provided in the output image. In some examples, a blur strength parameter has been obtained in block 212 of FIG. 2. In some implementations, the blur strength parameter can be used to interpolate between a determined output pixel value and the corresponding input image pixel value to obtain the final output pixel value, e.g., similarly as described above for FIG. 6.

In block 914, it is determined whether another output pixel for the output image is to be processed, e.g., whether any pixels remain in the input image that have not yet been processed into output pixels. If so, the method returns to block 902 to select the next pixel of the input image for processing and generation of a corresponding output pixel.

In various implementations, all of the pixels of the input image, or a subset of the pixels of the input image, can be selected for processing in method 900.

If there are no more output pixels to process in block 914, e.g., all of the output pixels have been generated for the output image, then the method continues in the main process to provide the output image. For example, the method can return to block 216 of FIG. 2 to display the output image including the determined output pixels (combined pixels).

FIG. 10 is a diagrammatic illustration of an example user interface 1000 allowing adjustment of blur parameters by a user and providing a display of a blur effect in a displayed image based on the blur parameters. In some examples, user interface 1000 can be displayed by a display device of a user device, e.g., a client device used by a user. In some implementations, the display is provided on a display screen of a mobile device, e.g., a mobile phone, tablet, goggles or glasses, laptop computer, etc. For example, the user device can be any of client devices 122, 124, 126, or 128. In additional examples, the user interface can be displayed by a display screen of a non-portable device, e.g., a display monitor in communication with a desktop computer or other non-portable device.

In this example, interface 1000 includes displays of an image 1002 and a set of blur parameter controls 1004. Image 1002 can be displayed in response to selection or commands by a user of the interface 1000, for example, or can be displayed after being selected by the user device or other system. In the example of FIG. 10, image 1002 has not received any blur effects.

Blur parameter controls 1004 enable a user to provide user input to adjust various blur parameters for a blur effect to be applied to the image 1002. In this example, the blur parameters include blur strength that is adjustable by a slider control 1006, focal plane position that is adjustable by a slider control 1008, and focal range that is adjustable by a slider control 1010. The slider controls are receptive to user input, e.g., user touch input on a touch screen, or other user input provided via other input devices (e.g., pointing devices, voice commands, etc.). Other types of controls can be used in other implementations, e.g., input fields, menus, dials, etc.

Blur strength control 1006 adjusts the overall amount of bokeh blur that is to be applied to the image 1002. If this parameter is set to 0 ("none"), no blurring is applied to any pixels of the image 1002. If this parameter is fully enabled, e.g., set to a "full" setting at the right of the associated slider control, background pixels and potentially foreground pixels of the image 1002 are blurred by the full amount determined in the blurring process (e.g., based on mipmap images as described above). If this parameter is set to an intermediate value between full and none, then the final blur applied to the image 1002 is reduced in accordance with the intermediate value. For example, if the blur strength is set to 0.5, the determined blur effect is reduced by half in the image 1002.

Focal plane position control 1008 adjusts the depth position (depth value) of the focal plane used to determine the blur of the pixels of the image 1002. This parameter determines the depth value in the image 1002 that is considered "in focus," such that no blur is applied to pixels at this depth. The amount of blur applied to other pixels outside the focal plane in the image 1002 depends at least in part on the depth values of those pixels, e.g., the distance of those pixels to the focal plane. In this example, the focal plane position is indicated as a value in the range of 0 to 1, where 0 indicates a depth at the camera (e.g., at the front plane of the image) and 1 indicates the furthest depth provided in the image 1002.

Focal range control 1008 adjusts the magnitude of the focal range used to determine the blur of pixels of the image 1002. This parameter determines the amount of depth distance in front of the focal plane in which no blurring is applied, and establishes a depth of a foreground focal plane (based on the focal plane position), such that foreground blur is applied in front of the foreground focal plane. In this example, the focal range is designated as a value in the range of 0 to 1, where 0 indicates no focal range, e.g., only pixels at the focal plane of the image are unblurred, and 1 indicates a maximum focal range that extends the entire distance in front of the focal plane, from the focal plane to the front plane of the image (at the camera).

In some implementations, an apply or confirm control button 1012 is provided and can be selected by user input to command the device to apply a blur effect to the image 1002 as configured by the blur parameters 1004. In some implementations, no such apply control button 1012 need be provided or used, and the image 1002 is updated with a displayed blur effect based on a changed parameter immediately after or while user input is changing that parameter, e.g., in response to user input that adjusts the slider controls 1006, 1008, and/or 1010. The use of mipmap images that include blurred pixels, as described herein, allows a fast response time in determining and displaying blur effects based on changing blur parameters.

FIG. 11 is a diagrammatic illustration of user interface 1000 of FIG. 10, in which a blur effect has been applied to the image 1002 of FIG. 10 based on blur parameters of interface 1000 as selected by the user. The selected blur parameters for this example are shown in FIG. 11 designated with blur parameter controls 1004, where a full blur strength, a focal plane depth of about 0.2, and a focal range of about 0.2 are selected.

An image 1102 has been generated to include a bokeh blur based on the selected blur parameters shown by controls 1004 of FIG. 11 and using one or more features described herein. For example, pixels 1104 of image 1102 describing a person have a depth position in the foreground close to the front plane of the image, at a depth of about 0.1 to 0.2. This depth is at or in front of the focal plane depth, such that the pixels 1104 are in the foreground. Furthermore, the focal range extends from the focal plane to a depth of zero at the front plane of the image, causing no blurring to be added to the pixels 1104.

The pixels 1106 describe portions of the image 1102 that are outside the pixels 1104 describing the person, and have a depth further from the front plane of the image, e.g., further into the background of the image 1102. These pixels have a depth value that is higher than 0.2, placing them behind the focal plane and classifying them as background pixels. Therefore, the portions 1106 are blurred. The amount of the blur is based on the particular blur technique used for the pixels of the mipmap images (e.g., based on a particular blur curve) and the particular method used to render the blur effect, examples of which are described herein. For example, background pixels 1106 that are surrounded by other background pixels 1106 may be blurred based on pixel values of background mipmap images. In another example, background pixels 1106 that are close to or surrounded by one or more foreground pixels (e.g., pixels 1106 that are close to pixels 1104) may be blurred based on pixel values from background mipmap images as well as foreground mipmap images in some implementations, due to the effect of nearby foreground pixels on the blur of the background pixels.

The display of the blur effects in image 1102 can be displayed in approximately real-time, e.g., in quick response to changes of one or more slider controls 1006, 1008, and 1010 caused by user input (e.g., 1-10 milliseconds or less after receiving such user input), and/or user input that selects the apply control 1012. The use of generated mipmap images that include blurred pixels, as described herein, allows the blur effects to be displayed quickly, and allows a user to immediately see how adjustment of blur parameters affects the displayed appearance of an image.

FIG. 12 is a diagrammatic illustration of user interface 1000 of FIG. 10, in which another blur effect has been applied to the image 1002 of FIG. 10 based on blur parameters of interface 1000 as selected by the user. The selected blur parameters for this example are shown in FIG. 12 designated with blur parameter controls 1004, and are different than the blur parameters shown in FIG. 11. Here, a full blur strength, a focal plane depth of about 0.5, and a focal range of about 0.1 are selected.

An image 1202 has been generated to include a bokeh blur based on the selected blur parameters shown by controls 1004 of FIG. 12 and using one or more features described herein. For example, the pixels 1204 describing mid-scene furniture objects have a depth value of about 0.4 to about 0.5. This depth is at or closer than the selected focal plane depth, such that these pixels 1204 are on or closely in front of the focal plane, and are therefore classified as foreground pixels positioned in the foreground (positioned in front of the focal plane). Furthermore, the focal range extends from the focal plane (depth about 0.5) to a depth of about 0.4, and all of the pixels 1204 have a depth within the focal range. This causes no blurring to be added to the pixels 1204.

The pixels 1206 describing a person have a depth position that is less than 0.4 and are in the foreground. This depth is in front of the focal plane and in front of the foreground focal plane. Therefore, pixels 1206 are blurred based on a foreground blur curve. In some examples, the amount of the blur is based on mipmap images (having pixels blurred based on a particular blur curve) and the particular method used to render the blur effect, examples of which are described herein. For example, pixels 1206 that are surrounded by other foreground pixels may be blurred based on foreground mipmap images.

The pixels 1208 describe portions of the image 1202 that are different than the pixels 1204 and 1206 describing the person and mid-scene furniture objects. These pixels have a depth value that is higher than 0.5, placing them behind the focal plane and classifying them as background pixels. Thus, all of the pixels 1208 are blurred. The amount of the blur is based on the particular blur technique used for the pixels of the mipmap images (e.g., based on a particular blur curve) and the particular method used to render the blur effect, examples of which are described herein. For example, background pixels 1208 can be blurred based on one or more background mipmap images and/or foreground mipmap images similarly to background pixels described above in FIG. 11.

The display of the blur effects in image 1202 can be displayed in approximately real-time, e.g., in quick response to user input that changes one or more slider controls 1006, 1008, and 1010, and/or user input that selects the apply control 1012, similarly as described above. The use of mipmap images that include blurred pixels, as described herein, allows a user to immediately view how adjustment of blur parameters affects the displayed appearance of an image.

Figure 13:
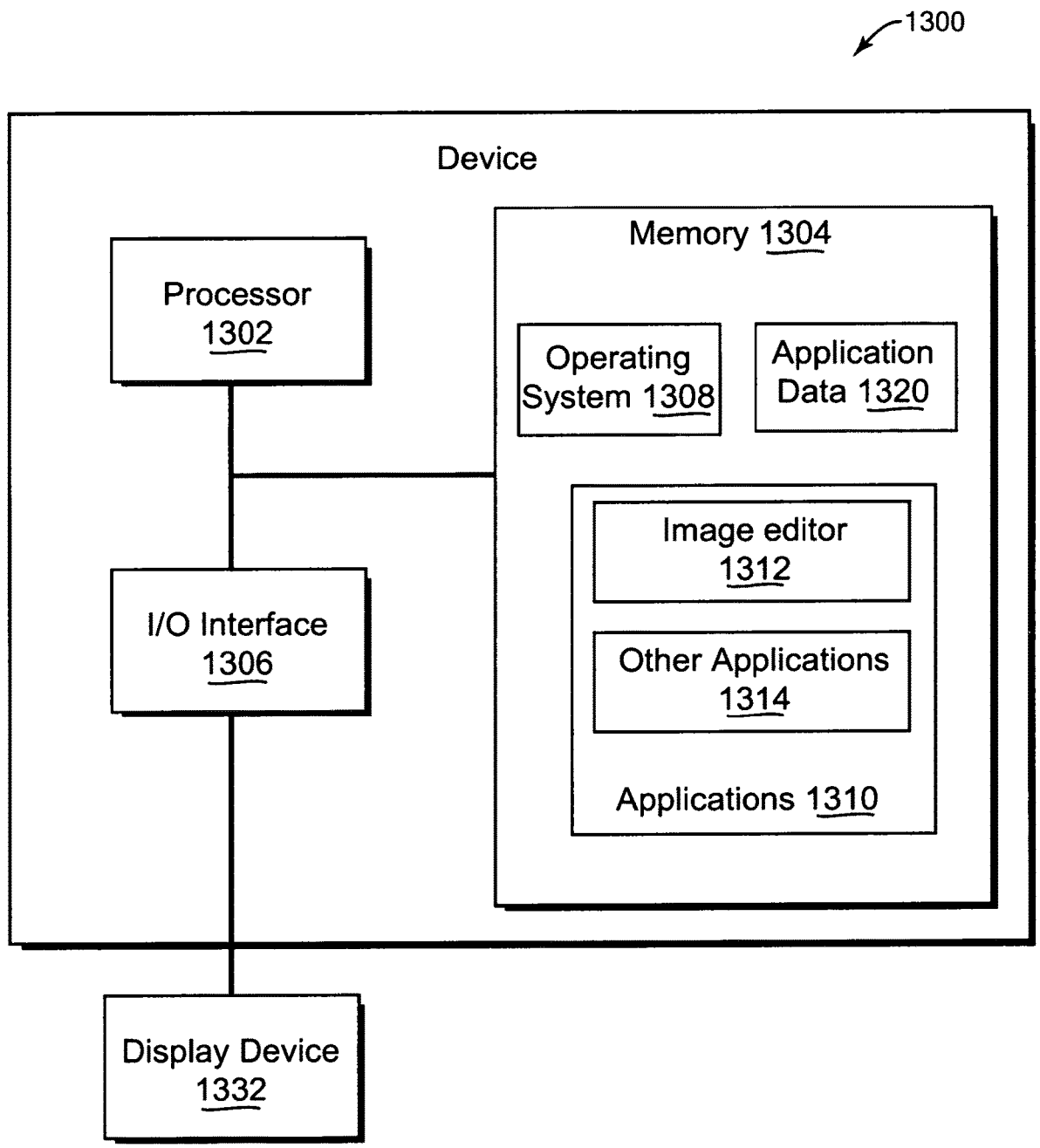
FIG. 13 is a block diagram of an example device which may be used for one or more implementations described herein.

FIG. 13 is a block diagram of an example device 1300 which may be used to implement one or more features described herein. In one example, device 1300 may be used to implement a computer device, e.g., a server device (e.g., server device 104 of FIG. 1), and perform appropriate method implementations described herein. In some implementations, device 1300 can be a client device to implement and/or be used with features described herein, e.g., client devices 120-126 shown in FIG. 1. Device 1300 can be any suitable computer system, server, or other electronic or hardware device. For example, the device 1300 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.).

In some implementations, device 1300 includes a processor 1302, a memory 1304, and input/output (I/O) interface 1306.

Processor 1302 can be one or more processors and/or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1304 is typically provided in device 1300 for access by the processor 1302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1304 can store software operating on the server device 1300 by the processor 1302, including an operating system 1308, one or more applications 1310, and application data 1320. In some implementations, applications 1310 can include instructions that enable processor 1302 to perform the functions described herein, e.g., some or all of the methods of FIGS. 2-5. Memory 1304 and any other type of storage (magnetic disk, optical disk, magnetic tape, or other tangible media) can be considered "storage" or "storage devices."

For example, applications 1310 can include an image editor application 1312, which as described herein can provide image editing functions such as determining and adding blur effects to images, e.g., displayed in a graphical user interface, where the user interface is receptive to user input to change blur parameters and/or perform other editing functions. Other applications or engines 1314 can also be included in applications 1310, e.g., communication applications, web browser applications, media display applications, web hosting engine or application, social networking engine or application, etc. In some implementations, a user interaction module and/or one or more of the other applications 1310 can, for example, provide a displayed user interface responsive to user input to display selectable options or controls, and data based on selected options. A machine learning application can be used to detect objects and types of objects in images, for example, based on training utilizing training data for such objects. Any of software in memory 1304 can alternatively be stored on any other suitable storage location or computer-readable medium.

In addition, memory 1304 (and/or other connected storage device(s)) can store images, metadata for the images (e.g., depth data for pixels of images, blend/transparency data, etc.), mipmap images, user data and preferences, and other instructions and data used in the features described herein. For example, application data 1320 can include one or more images (e.g., still images, videos, or other types of images) that can be processed as described herein, and associated metadata. In some examples, device 1300 can be a client device, and application data 1320 can include images and/or videos captured by a camera of the client device (not shown). In another example, device 1300 is a server device, and application data 1320 can be stored at the server (e.g., uploaded to the server from client devices). In some implementations, metadata may be stored along with, or separately from application data 1320.

Any of software in memory 1304 can alternatively be stored on any other suitable storage location or computer-readable medium. In addition, memory 1304 (and/or other connected storage device(s)) can store one or more messages, one or more taxonomies, electronic encyclopedia, dictionaries, thesauruses, message data, grammars, user preferences, and/or other instructions and data used in the features described herein. Memory 1304 and any other type of storage (magnetic disk, optical disk, magnetic tape, or other tangible media) can be considered "storage" or "storage devices."

I/O interface 1306 can provide functions to enable interfacing the server device 1300 with other systems and devices. Interfaced devices can be included as part of the device 1300 or can be separate and communicate with the device 1300. For example, network communication devices, storage devices (e.g., memory and/or database 106), and input/output devices can communicate via I/O interface 1306. In some implementations, the I/O interface can connect to interface devices such as input devices (keyboard, pointing device, touchscreen, microphone, camera, scanner, sensors, etc.) and/or output devices (display device, speaker devices, printer, motor, etc.). Some examples of interface devices include one or more cameras which can capture images. Some implementations can provide a microphone for capturing sound (e.g., as a part of captured images, voice commands, etc.), audio speaker devices for outputting sound, or other input and output devices.

Additional examples of interfaced devices that can connect to I/O interface 1306 can include one or more display devices 1332 that can be used to display content, e.g., images, video, and/or a user interface of an output application as described herein. Display device 1332 can be connected to device 1300 via local connections (e.g., display bus) and/or via networked connections and can be any suitable display device. Display device 1332 can include any suitable display device such as an LCD, LED, or plasma display screen, CRT, television, monitor, touchscreen, 3-D display screen, or other visual display device. For example, display device 1332 can be a flat display screen provided on a mobile device, multiple display screens provided in a goggles device, or a monitor screen for a computer device.

For ease of illustration, FIG. 13 shows one block for each of processor 1302, memory 1304, I/O interface 1306, and software blocks 1308, 1310, 1312, 1314, and 1330. These blocks may represent one or more processors or processing circuitries, operating systems, memories, I/O interfaces, applications, and/or software modules. In other implementations, device 1300 may not have all of the components shown and/or may have other elements including other types of elements instead of, or in addition to, those shown herein. While some components are described as performing blocks and operations as described in some implementations herein, any suitable component or combination of components of network environment 100, device 1300, similar systems, or any suitable processor or processors associated with such a system, may perform the blocks and operations described.

One or more methods disclosed herein can operate in several environments and platforms, e.g., as a stand-alone computer program that can run on any type of computing device, as a web application having web pages, as a mobile application ("app") run on a mobile computing device, etc.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to provide blurring in an image, the method comprising:
obtaining, by at least one hardware processor, an input image;
generating, by the at least one hardware processor, a plurality of background mipmap images based on the input image, wherein generating each background mipmap image includes applying a respective background blur to each of a plurality of background pixels derived from the input image, wherein each background pixel has a respective depth that is greater than a depth of a focal plane associated with the background mipmap image that includes the background pixel;
generating, by the at least one hardware processor, a plurality of foreground mipmap images based on the input image, wherein generating each foreground mipmap image includes applying a respective foreground blur to each of a plurality of foreground pixels derived from the input image, wherein each foreground pixel has a respective depth that is less than a depth of a focal plane associated with the foreground mipmap image that includes the foreground pixel;
obtaining, by the at least one hardware processor, parameter data that indicates an output focal plane depth for an output focal plane of an output image to be generated; and
generating, by the at least one hardware processor, the output image, wherein the output image includes output pixels having output pixel values that include output blur, and wherein generating the output image includes determining blurred pixel values based on one or more particular mipmap images selected, based on the output focal plane depth, from the plurality of background mipmap images or from the plurality of foreground mipmap images.

2. The method of claim 1 wherein the one or more particular mipmap images include a plurality of particular mipmap images selected from the plurality of background mipmap images and from the plurality of foreground mipmap images.

3. The method of claim 1 wherein the respective depth of each background pixel is greater than a depth of a respective focal plane associated with the background pixel, and wherein the respective depth of each foreground pixel is less than a depth of a respective focal plane associated with the foreground pixel.

4. The computer-implemented method of claim 3, wherein applying the respective background blur to each of the plurality of background pixels includes:
applying the respective background blur to each background pixel based on surrounding pixels derived from the input image that surround the background pixel and based on the respective focal plane associated with the background pixel, wherein the respective focal plane is determined based on the depth of the background pixel and a background mipmap blur level associated with the respective background mipmap image.

5. The computer-implemented method of claim 1, wherein generating the output image includes:
determining opaque pixel values based on at least one background mipmap image of the one or more particular mipmap images;
determining overlay pixel values based on at least one foreground mipmap image of the one or more particular mipmap images; and
combining the opaque pixel values with corresponding overlay pixel values to determine the output pixel values of the output image, wherein the overlay pixel values correspond with the opaque pixel values based on pixel positions in the background mipmap image and pixel positions in the foreground mipmap image.

6. The computer-implemented method of claim 5, wherein determining the opaque pixel values based on the at least one background mipmap image includes, for each background pixel derived from the input image:

selecting one or more background mipmap images from the plurality of background mipmap images based on the depth of the background pixel; and determining, based on the one or more background mipmap images, a particular opaque pixel value corresponding to the background pixel.

7. The computer-implemented method of claim 5, wherein determining the overlay pixel values based on at least one foreground mipmap image includes, for each foreground pixel derived from the input image:

selecting one or more foreground mipmap images of the plurality of foreground mipmap images based on the output focal plane depth and based on an output focal range; and determining, based on the one or more foreground mipmap images, a particular overlay pixel value corresponding to the foreground pixel.

8. The computer-implemented method of claim 5, wherein the combining includes blending the opaque pixel values with the corresponding overlay pixel values to a degree based on transparency values associated with the corresponding overlay pixel values, the transparency values indicating a respective transparency of the corresponding overlay pixel values.

9. The computer-implemented method of claim 1, wherein applying the respective foreground blur to each of the plurality of foreground pixels includes:

applying the respective foreground blur to each foreground pixel based on surrounding pixels of the input image that surround the foreground pixel, and based on a foreground focal plane depth of a foreground focal plane associated with the respective foreground mipmap image.

10. The computer-implemented method of claim 1, wherein generating the plurality of background mipmap images includes downscaling the input image to a plurality of background downscaled images and applying the respective background blur to each pixel of each of the background downscaled images, and wherein at least two of the background downscaled images are downscaled by different scale levels.

11. The computer-implemented method of claim 1, further comprising receiving, by the at least one hardware processor, user input in a displayed user interface, wherein the user input is indicative of the output focal plane depth.

12. A system comprising:

a memory storing an input image; and at least one processor configured to access the memory and configured to perform operations comprising:

generating a plurality of background mipmap images based on the input image, wherein generating the plurality of background mipmap images includes, for each background mipmap image, applying a background blur to each particular background pixel of a plurality of pixels derived from the input image for the background mipmap image, wherein the background blur is applied to each particular background pixel, wherein each particular background pixel has a respective depth greater than a depth of a respective focal plane associated with the particular background pixel;

generating a plurality of foreground mipmap images based on the input image, wherein generating the foreground mipmap images includes, for each foreground mipmap image, applying a foreground blur to each particular foreground pixel of a second plurality of pixels derived from the input image for the foreground mipmap image, wherein the foreground blur is applied to each particular foreground pixel, wherein each particular foreground pixel has a respective depth less than a depth of a respective focal plane associated with the particular foreground pixel;

obtaining data indicating an output focal plane depth for an output focal plane of an output image;

for each designated pixel of a set of pixels of the input image, selecting at least one particular mipmap image of the plurality of background mipmap images or of the plurality of foreground mipmap images, the selecting based on the output focal plane depth and based on the depth of the designated pixel;

determining blurred output pixel values of the output image using the at least one particular mipmap image; and causing the output image to be displayed on a display device.

13. The system of claim 12, wherein the operation of determining the blurred output pixel values includes:

determining, based on the output focal plane depth, whether each pixel of the input image is a background pixel associated with a depth value that is greater than a depth of the output focal plane of the output image, or a foreground pixel associated with a depth value that is less than a depth of the output focal plane of the output image, wherein the operation of selecting the at least one particular mipmap image includes selecting at least one of the background mipmap images in response to the pixel of the input image being the background pixel, and selecting at least one of the foreground mipmap images in response to the pixel of the input image being the foreground pixel.

14. The system of claim 12, wherein the operation of generating the plurality of background mipmap images includes, for each background mipmap image, downscaling the input image to a background downscaled image, wherein applying the background blur to each particular background pixel includes applying the background blur to each particular background pixel of the background downscaled image, and wherein the operation of generating the plurality of foreground mipmap images includes, for each foreground mipmap image, downscaling the input image to a foreground downscaled image, wherein applying the foreground blur to each particular foreground pixel includes applying the foreground blur to each particular foreground pixel of the foreground downscaled image.

15. The system of claim 12, wherein the operation of generating the plurality of background mipmap images includes, for each background mipmap image, assigning a background mipmap blur level to the background mipmap image, wherein the respective focal plane associated with the particular background pixel is determined based on the depth of the particular background pixel and based on the background mipmap blur level assigned to the background mipmap image such that respective focal planes associated with the pixels of the background mipmap image vary among different pixels of the background mipmap image.

16. The system of claim 15, wherein the operation of determining the blurred output pixel values of the output image using the at least one particular mipmap image includes operations of:

determining a difference between the depth of the designated pixel and the output focal plane depth; and selecting the at least one particular mipmap image which has a respective background mipmap blur level that is closest among the plurality of background mipmap images to a lookup value determined based on the depth of the designated pixel and the output focal plane depth.

17. The system of claim 12, wherein the at least one processor is configured to perform further operations comprising:
obtaining a blur strength parameter that indicates a level of blur for the output image, wherein the blur strength parameter is based on user input,
wherein determining the blurred output pixel values includes, for each designated pixel of the input image, interpolating between a corresponding mipmap pixel value and a pixel value of the designated pixel the input image using the blur strength parameter.

18. The system of claim 12, wherein the operation of determining the blurred output pixel values includes:
determining opaque pixel values based on at least one background mipmap image of the at least one particular mipmap image;
determining overlay pixel values based on at least one foreground mipmap image of the at least one particular mipmap image; and
combining the opaque pixel values with corresponding values of the overlay pixel values to determine the blurred output pixel values of the output image.

19. A non-transitory computer readable medium having stored thereon software instructions that, when executed by at least one processor of a device, cause the processor to perform operations comprising:
obtaining, by the at least one hardware processor, an input image;
generating, by the at least one hardware processor, a plurality of background mipmap images based on the input image, wherein generating each background mipmap image includes applying a respective background blur to each of a plurality of background pixels derived from the input image, wherein each background pixel has a respective depth that is greater than a depth of a focal plane associated with the background mipmap image that includes the background pixel;
generating, by the at least one hardware processor, a plurality of foreground mipmap images based on the input image, wherein generating each foreground mipmap image includes applying a respective foreground blur to each of a plurality of foreground pixels derived from the input image, wherein each foreground pixel has a respective depth that is less than a depth of a focal plane associated with the foreground mipmap image that includes the foreground pixel;
obtaining, by the at least one hardware processor, parameter data indicating an output focal plane depth for an output focal plane of an output image; and
generating, by the at least one hardware processor, the output image, wherein the output image includes output pixels having output pixel values that include an output blur, and wherein generating the output image includes determining blurred pixel values based on one or more particular mipmap images selected, based on the output focal plane depth, from the plurality of background mipmap images or from the plurality of foreground mipmap images.

20. The non-transitory computer readable medium of claim 19, wherein the respective depth of each background pixel is greater than a depth of a respective focal plane associated with the background pixel, wherein the respective depth of each foreground pixel is less than a depth of a respective focal plane associated with the foreground pixel, and
wherein the operation of generating the output image includes:
determining, based on the output focal plane depth, whether each pixel of the input image is one of a background pixel associated with a depth value that is greater than a depth of the output focal plane of the output image, or a foreground pixel associated with a depth value that is less than a depth of the output focal plane of the output image; and
selecting at least one of the one or more particular mipmap images from the plurality of background mipmap images in response to the pixel of the input image being a background pixel, and selecting at least one of the one or more particular mipmap images from the plurality of foreground mipmap images in response to the pixel of the input image being a foreground pixel.

* * * * *